United States Patent [19]
Reid

[11] Patent Number: 4,512,895
[45] Date of Patent: Apr. 23, 1985

[54] PUMPLESS CLARIFIER APPARATUS AND PROCESS FOR OPERATION THEREOF IN COMBINATION WITH A DRAFT TUBE CIRCULATOR/AERATOR

[76] Inventor: John H. Reid, 7 Stansbury Ct., Fredericksburg, Va. 22401

[21] Appl. No.: 433,639

[22] Filed: Oct. 12, 1982

Related U.S. Application Data

[63] Continuation-in-part of Ser. No. 361,205, Mar. 29, 1982, Pat. No. 4,455,232, which is a continuation-in-part of Ser. No. 75,412, Sep. 14, 1979, Pat. No. 4,394,268, which is a continuation-in-part of Ser. No. 28,383, Apr. 9, 1979, Pat. No. 4,278,547, which is a continuation-in-part of Ser. No. 848,705, Nov. 4, 1977, abandoned, which is a continuation-in-part of Ser. No. 649,995, Jan. 19, 1976, abandoned.

[51] Int. Cl.³ .............................................. C02F 3/20
[52] U.S. Cl. ..................................... 210/627; 210/629; 210/194; 210/195.3; 210/197; 210/220; 210/926; 261/91; 261/93
[58] Field of Search ............... 210/194, 170, 219, 220, 210/221.2, 926, 629, 197, 221.1, 195.3, 626–628; 261/91, 93, 36 R, 124

[56] References Cited

U.S. PATENT DOCUMENTS

| 3,421,626 | 1/1969 | Schramm et al. | 210/195.3 |
| 4,199,452 | 4/1980 | Mandt | 210/195.3 |
| 4,383,922 | 5/1983 | Beard | 210/170 |
| 4,394,268 | 7/1983 | Reid | 210/926 |

FOREIGN PATENT DOCUMENTS

| 1932640 | 2/1971 | Fed. Rep. of Germany | 210/926 |
| WO82/00134 | 1/1982 | PCT Int'l Appl. | 210/926 |
| 2075856 | 11/1981 | United Kingdom | 210/926 |

OTHER PUBLICATIONS

The Kansas City Times; Front Page & Continuation Therefrom; "Innovative Sewage Treatment Plan a Winner"; 2/22/82.

Primary Examiner—Benoit Castel
Attorney, Agent, or Firm—Benasutti and Murray

[57] ABSTRACT

An integral clarifier is provided that operates without a pump by deriving the clarifier feed stream and its accompanying pump head from the flow being pumped through the draft tube of a draft tube circulator/aerator assembly in a complete mix system or in a basin oxidation ditch. The clarifier feed stream is delivered to the clarifier with this pump head substantially intact to create a differential hydraulic head between the surface of the clarified liquor within the clarifier and the surface of the mixed liquor within the complete mix tank or within the endless channel of the barrier oxidation ditch. The clarifier may be located in any suitable place but is preferably alongside the complete mix tank or alongside the discharge channel of the barrier oxidation ditch, within the discharge channel so that its upstream side forms the barrier, or surrounded by the endless channel, particularly if the clarifier and the ditch are circular in shape.

26 Claims, 16 Drawing Figures

PUMPLESS CLARIFIER APPARATUS AND PROCESS FOR OPERATION THEREOF IN COMBINATION WITH A DRAFT TUBE CIRCULATOR/AERATOR

CROSS REFERENCE TO RELATED APPLICATIONS

This application is a continuation-in-part: of Ser. No. 06/361,205, filed Mar. 29, 1982, entitled "Method and Apparatus for Induced-flow Circulation and Pressurized Aeration, in a Barrier Oxidation Ditch", now U.S. Pat. No. 4,455,232; which is a continuation-in-part of Ser. No. 75,412, filed Sept. 14, 1979, entitled "Conversion of Plug Flow and Complete Mix Aeration Basins to Barrier Oxidation Ditches",now U.S. Pat. No. 4,394,268; which is a continuation-in-part of Ser. No. 28,383, filed Apr. 9, 1979, entitled "Conservation of Momentum in a Barrier Oxidation Ditch" and now U.S. Pat. No. 4,278,547, issued July 14, 1981; which is a continuation-in-part of Ser. No. 848,705, filed Nov. 4, 1977, entitled "Flow Control Apparatus and Process for an Oxidation Ditch" of John Hager Reid, and now abandoned; which is a continuation-in-part of Ser. No. 649,995, filed Jan. 19, 1976, entitled "Flow Control Apparatus and Method for Aerobic Sewage Treatment" of John Hager Reid, now abandoned.

BACKGROUND OF THE INVENTION

1. Field of the Invention

This invention relates to wastewater treatment. The invention especially relates to methods and apparatuses for clarifying mixed liquor in activated sludge processes that are conducted in oxidation ditches of racetrack or loop channel configuration or in conventional complete mix tanks.

2. Review of the Prior Art

Oxidation ditches for continuous aerobic treatment of liquid wastewaters have been used since the early 1950's. They were developed in Holland by Dr. Ir A. Pasveer, as a variation of the activated sludge process, and were patented in Dutch Pat. No. 87,500 and British Pat. No. 796,438.

Barrier oxidation ditches have been operating since 1977, primarily for treating municipal and poultry processing wastewaters. Barrier oxidation ditches are described in U.S. Pat. No. 4,260,486 of John H. Reid, which is fully incorporated herein by reference. A barrier oxidation ditch comprises an endless channel, a barrier disposed athwart the channel, a vertically mounted pump having an impeller within a draft tube which is vertically mounted at the upstream side of the barrier, a J-shaped discharge duct which is flow-connected to the draft tube and is mounted below the bottom of the channel and below the barrier to provide a discharge on the downstream side thereof, and an aeration means which includes a sparge disposed beneath the impeller and, if needed, diffusers which are removably mounted so that they introduce additional diffused air at about the bottom of the discharge duct. This barrier oxidation ditch, which pumps all of the circulating mixed liquor past the barrier, is herein described as a total barrier oxidation ditch.

It has further been ascertained that the barrier oxidation ditch of U.S. Pat. No. 4,260,486 creates a differential hydraulic head that is readily measurable when the flow is being pumped through one or more draft tubes and discharge ducts, thereby indicating that there exists a dammed-up momentum in the mixed liquor which is approaching the barrier. It is important to release the energy contained in the dammed-up momentum.

An improved barrier oxidation ditch is disclosed in U.S. Pat. No. 4,278,547 of John H. Reid; it is also incorporated herein by reference. This ditch comprises a barrier having adjustably sized openings and/or gateways therethrough for conserving the momentum of the mixed liquor, a pump means for pumping most of the liquor past the barrier, and an aeration means for aerating the pumped liquor and for selectively aerating the induced-flow liquor passing through the openings so that there is no backmixing of aerated liquor and can be relatively little heterogenous aeration when the aerated pumped liquor is blended, downstream of the barrier, with the induced-flow liquor. This barrier oxidation ditch, which pumps a portion of the circulating mixed liquor past the barrier and provides openings for the remainder to move through the barrier is herein described as a partial barrier oxidation ditch.

One of the major benefits of the barrier oxidation ditch of U.S. Pat. No. 4,260,486 is that the sparge in the downdraft tube provides for introducing diffused air to the mixed liquor at a shallow depth, thereby forming an air-liquor mixture, and then for pumping this mixture downwardly with its impeller into the discharge duct to a sub-channel oxygen-transfer depth, at the lowest portion of the discharge duct, that is well below the channel bottom. This oxygen-transfer depth increases the driving force for transferring oxygen molecules across the films at the gas-liquid interfaces, of the air bubbles. Other additional benefits of great practical importance are: (1) the energy required for downwardly pumping the air-liquor mixture is considerably less than the energy required for downwardly pumping the liquor alone and for separately compressing air to the hydraulic pressure existing at the oxygen-transfer depth; and (2) a very high level of turbulence is provided in the oxygen-transfer zone, measured by brake horsepower/1000 ft$^3$.

For any aeration system used in transferring oxygen to a particular wastewater, sewage, or mixed liquor, its oxygen transfer efficiency is a function of five major parameters: bubble size, bubble retention time, driving force across the air-liquid interface for the dissolved oxygen, hydrostatic pressure, and degree of turbulence in the oxygen-transfer zone. However, the adjustable gateways through the barrier of U.S. Pat. No. 4,278,547 allow the induced-flow portion of the mixed liquor to pass through the barrier and be aerated at a depth above the channel bottom instead of at the sub-channel depth that is available within a discharge duct, thereby losing at least some of the advantages of retention time, driving force, hydrostatic pressure, and possibly even turbulence.

U.S. Pat. No. 4,455,232 of John H. Reid accordingly discloses a barriered circulator/aerator in the endless channel of a barrier oxidation ditch which provides a directly pumped flow of mixed liquor into a central liquor inlet zone and an induced flow of mixed liquor into a surrounding liquor inlet zone at the inlet of a deep oxygen contact duct which passes beneath the barrier to the discharge channel on the downstream side thereof. It further provides mixing of diffused air with the directly pumped flow and/or the induced flow and then moving the combined air-liquor flows into the deepest portion of the contact duct where point-source pressurized aeration of both flows occurs. Eddy jet diffusers are preferably used for aerating the induced flow. Oxygen transfer efficiencies are obtained that are 1.6 to 2.2 times as great per brake horsepower per hour as that attainable by 100% pumping of the mixed liquor in a total barrier oxidation ditch, as disclosed in U.S. Pat. No. 4,260,486.

This improved barrier oxidation ditch, however, compels 100% of the flow, both pumped and induced, to change direction 90° while moving downwardly and then to change direction 135° while moving beneath the barrier and upwardly. As is well known in hydraulic theory, such 225° of direction changing causes significant energy consumption. It would be desirable to provide a means for passing the liquor from the intake channel to the discharge channel with minimum directional change.

When the air-liquor mixture has reached the lowest portion of the discharge duct, there is also very little time available for oxygen transfer from bubble to liquor across the films of the liquor-gas interface before the liquor/air mixture begins to rise. Yet, it is at this point in passage from the intake channel to the discharge channel that transfer efficiency is highest because of maximum hydrostatic pressure. Another factor of importance is that the microorganisms are in an oxygen-starved condition and avidly utilize the oxygen as fast as it transfers across the liquor-air films into the bulk liquor, so that the bulk liquor cannot become saturated if the MLSS content is reasonably high. An unusually large proportion of the oxygen in the bubbles is accordingly able to transfer across the films into the bulk liquor. It would accordingly be desirable to prolong the bubble retention time at the maximum depth. However, simply lengthening the discharge duct, such as by thickening the barrier, tends to waste the available land area.

An elongated clarifier is described in U.S. Pat. No. 3,788,477 of Love, for use alongside complete-mix tanks. As described in this patent, flow of sludge from the sloping bottom of the clarifier into the adjacent mixing basin is limited by flow control plates and is picked up inside the mixing basin by the downward and inward flow of mixed liquor along the sides and bottom of the mixing basin. Use of sludge return pumps can thereby be avoided.

This clarifier was installed alongside the discharge channel in several barrier oxidation ditches during 1979 and 1980. However, in a barrier oxidation ditch, the flow is translational, not toroidal as in the mixing basin of a complete-mix system. It was consequently discovered that the sludge did not adequately slide out into the discharge channel of a barrier oxidation ditch but had to be pumped out of the clarifier because the turbulent translational flow in the discharge channel created a positive pressure that interferred with automatic discharge of the sludge.

In about 1979, a brochure entitled "Lightnin Treatment System" was published by Mixing Equipment Co., Rochester, N.Y., which schematically showed the integral clarifier of U.S. Pat. No. 3,788,477 disposed downstream of the circulator/aerator in a barrier oxidation ditch and also aligned transversely to the channel so that its upstream side formed the barrier and its downstream or discharge side was athwart the channel and immediately upstream of the terminus of the discharge duct. Moreover, the length of the clarifier, as illustrated, was shorter than its width and was, in fact, the same as the width of the channel. However, such an integral clarifier would, in most cases, be far too small to be combined with a barrier oxidation ditch.

If the size of the clarifier were to be increased by extending the discharge side or outer baffle to a location far down the discharge channel and past the end of the discharge duct, there would be such a pool of violently agitated air moving beneath the clarifier and boiling up past the sludge discharge space of the clarifier that its operation would be impossible. In addition to this discharging difficulty, the bottom of this sideways-extended clarifier would have such a slight slope that settled sludge would not slide downwardly toward the discharge space, whereby its operation would be unsuccessful for this reason as well.

As disclosed in U.S. Pat. No. 4,303,516 of Stensel et al, a rectangularly shaped clarifier is mounted in one or both channels of an oxidation ditch which has a mechanical aerator at one end, as taught in U.S. Pat. No. 3,510,110 of Klein. This clarifier has the same depth as the channel depth, but the channel bottom is excavated beneath the bottom of the clarifier to provide a submerged passage for the mixed liquor. The floor of the clarifier slopes toward the channel sidewall in one embodiment and terminates in a stilling plate that is spaced upwardly from the sidewall to provide a sludge discharge space therebetween. In another embodiment, the floor is horizontally disposed as spaced-apart rectangular plates having rectangular ports therebetween which are athwart the channel, each rectangular port having a shallowly inclined plate along its upstream edge and a steeply inclined plate along its downstream edge. The velocity of the flowing wastewater is increased as it passes beneath the plates so that sludge is drawn from the clarifier through the ports.

This Stensel et al clarifier might perform well if disposed in the return channel, opposite the barrier of a barrier oxidation ditch, or in its intake channel, but if disposed in its discharge channel and close to the barrier, the uprushing air from the discharge duct would enter the clarifier through the discharge ports of either embodiment and disastrously interfere with its operation.

Clarified liquor is typically and generally removed from clarifiers in activated sludge processes by gravity flow. Scum is almost invariably pumped from the scum trough. Settled sludge is removed from the clarifier and recycled to the activated sludge aeration basin by gravity flow followed by pumping, by siphon flow followed by pumping, or by direct pumping. The mixed liquor must be pumped from the aeration basin into the clarifier to create a differential hydraulic head between the surface of the clarified liquor and the surface of the mixed liquor if gravity flow or siphon flow are to operate without the necessity for pumping the return sludge. Less liquid must be pumped, however, if the mixed liquor flows in by gravity and the sludge is returned by pump to the activated sludge treatment apparatus. Pumped flow from the aeration basin to the clarifier is consequently unusual because it requires more power and because the forces generated by a high-speed pumping impeller tend to shear biological flocs, causing sludge settleability to be reduced.

Siphon flow has been used in clarifiers for many years. U.S. Pat. No. 3,494,462 describes a "partial siphon", operating within a circular clarifier having bottom scrapers, in which an air space is maintained above the liquid which is fed into the siphon from the rising pipe to the down pipe, whereby the settled sludge may be perfectly evacuated, especially when the siphon functions as a flow regulator.

A sludge removal system for a clarifier, formed as a rectangular tank and utilizing a plurality of siphons, is described in U.S. Pat. No. 3,333,704. The siphons are supported on a floating carriage. Each siphon comprises a depending pipe of inverted T-form having a horizontally disposed inlet lower branch, a horizontal pipe which is flow connected to the depending pipe, and a U-tube which is flow connected to the horizontal pipe and moves back and forth through a siphon outlet along one long side of the clarifier as the carriage is pulled back and forth within the tank.

Draft tube circulator/aerators have been employed in complete mix basins for several years. Often referred to as a submerged turbine aerator of the axial flow type, a draft tube circulator/aerator has an upflow or downflow impeller which rotates within a draft tube beneath an intake funnel or within the funnel itself. This impeller rotates at 90–100 rpm so that it is a low-speed pump and causes little damage to biological flocs. The draft tube usually extends from several feet below the surface of the liquor to several feet above the bottom of the basin. An aerating device termed an air sparge is disposed below the impeller and provides fine bubbles as the fast-flowing liquor shears the outgoing streams of air.

A pertinent characteristic of both the Love and the Stensel et al clarifiers is that they are integral clarifiers relying upon flowing currents of mixed liquor, which are respectively within an adjacent complete mix tank or oxidation ditch channel, for removing their settled sludges without using a sludge pump for this purpose. Such integral operation is possible because both clarifiers have openings in or near their bottoms which freely allow their sludges to move therethrough. The very practical disadvantage of bottom connections forming such combined systems is that the clarifier and the complete mix tank or the clarifier and the oxidation ditch must be drained together if any repairs are needed to either unit of the combined system. For example, an oxidation ditch having an average volume of 750,000 gallons would be operated in combination with a clarifier of about 25,000 gallons; having to drain the clarifier for repairs would consequently create an enormous additional burden with respect to the oxidation ditch. Therefore, an integral clarifier that has sealed boundary surfaces is needed so that either unit can be drained separately.

SUMMARY OF THE INVENTION

It is therefore an object of this invention to provide a clarifier for an activated sludge aeration system in which the surface of the clarified liquor within the clarifier is maintained at a higher elevation than the surface of the mixed liquor within the activated sludge aeration system without using a pump, air lift, or other powered means for feeding the clarifier and without using a pump, air lift, or other powered means for recycling the sludge from the clarifier to the activated sludge aeration system.

It is also an object to provide a clarifier feeding apparatus that obtains energy for maintaining this higher elevation within the clarifier from an existing downflow circulator/aerator, operating in combination with a draft tube, within the activated sludge aeration system.

It is further an object to utilize at least one circulator/aerator which is disposed within a complete-mix basin as the source of the energy.

It is still further an object to utilize at least one circulator/aerator operating within a barrier oxidation ditch as the source of the energy.

It is another object to provide a structural combination of the clarifier and the barrier oxidation ditch in which at least one wall is shared and preferably in which the upstream wall of the clarifier forms the barrier for the ditch.

It is additionally an object to provide an integral clarifier having sealed side and bottom surfaces which are structurally combined with a barrier oxidation ditch or with a complete mix tank and which may be drained separately from the ditch or tank.

It is finally an object to utilize this structural combination for saving construction costs and for providing a method for operating the barrier oxidation ditch with increased efficiency.

In accordance with the foregoing objects and the principles of this invention, an apparatus and method are provided for combining a clarifier and a draft tube circulator/aerator so that the surface of the clarified liquor in the clarifier is continuously maintained at a selected higher elevation than the surface of the mixed liquor in the aeration basin, such as the surface of the translationally flowing mixed liquor in the channel of a barrier oxidation ditch. The differential hydraulic head that is thereby produced furnishes the power required for removing settled sludge from the bottom of the clarifier without using any pump.

This method comprises taking a small percentage of the mixed liquor and its associated pump head (i.e., hydraulic energy head) from a draft tube circulator/aerator of the activated sludge aeration basin and conveying both to the clarifier. The pump head, as expressed in the well-known Bernoulli equation, comprises the elevation head, the pressure head, and the velocity head of the circulator/aerator (at the point of such taking) relative to the surface of the clarified liquor in the clarifier. The activated sludge aeration basin may be any tank-type apparatus that includes an axial-flow draft tube circulator/aerator having a downflow impeller. A barrier oxidation ditch, total or partial, is preferred for operating in combination with the clarifier and is hereinafter principally utilized for exemplary descriptions.

This apparatus and method comprise, in combination with a barrier oxidation ditch, for example:

A. a means for intercepting a clarifier feed stream of mixed liquor, as a portion of the flow being pumped past the barrier of the barrier oxidation ditch, and for selectively receiving the available pump head of at least this feed stream; and B. a means for:
1. conveying the clarifier feed stream from the barrier oxidation ditch to the clarifier, and
2. substantially transmitting the received pump head to the clarifier, whereby the surface of the clarified liquor in the clarifier is continuously maintained at a higher level than the surface of the mixed liquor in the endless channel of the barrier oxidation ditch to create a differential hydraulic head therebetween.

In the preferred form of total or partial barrier oxidation ditch, the flow is pumped downwardly by a downflow impeller operating within a funnel on the upstream side of the barrier which is sealably disposed athwart the endless channel. The pump forces the flow downwardly past a sparge or air diffuser device and through a downdraft tube which is flow connected to the funnel and then through a discharge duct which is flow connected at one end to the lower end of the downdraft tube and which passes beneath the barrier to discharge on its downstream side.

The interception of the pumped flow to capture the clarifier feed stream can occur in three locations: (a) below the impeller and above the aeration device, (b) within the down-draft tube and below the impeller and the sparge; or (c) within the discharge duct and consequently also below the impeller and the sparge. In location (a), mixed liquor alone forms the clarifier feed stream, and the pump head is maximum. In locations (b) and (c), a mixture of mixed liquor and air bubbles forms the clarifier feed stream. The differential hydraulic head forms effectively in either situation, but the clarifier tends to operate with less interference from "rising sludge", caused by denitrification, if air bubbles are a part of the clarifier feed stream. In addition, the bubbles generate an air lift effect when the feed stream reaches the clarifier. However, the bubbles reduce the carrying capacity of the intake pipe and thereby increase friction and require the use of a larger intake pipe. The settled sludge is returned to the barrier oxidation ditch, although a portion may be selectively diverted to an ultimate sludge disposal means. The clarified liquor is typically sent ot a disinfection station and then may be dechlorinated and post-aerated before discharge to a flowing stream or other body of water. The scum is also handled in a conventional manner.

The clarifier may be located in any convenient place, within the vicinity of the aeration basin, that permits conveyance of the clarifier feed stream over as reasonably short a distance as possible. Preferably, the clarifier, if rectangular in shape, is located alongside the complete mix basin or alongside the barrier oxidation ditch and with at least one side of the basin or ditch forming at least one side of the clarifier. Such a spot can therefore be: (1) outside of the barrier oxidation ditch and alongside its discharge channel which is that part of the endless channel that is downstream of the barrier, (2) surrounded by the endless channel as an island, or (3) inside the discharge channel itself, whereby the discharge duct passes beneath the clarifier bottom and the upstream wall of the clarifier forms the barrier. The third alternative is highly preferred and is fully disclosed in a sister application Ser. No. 06/433,638, filed on even date herewith by the same inventor and entitled "An Improved Barrier Oxidation Ditch Having Increased Flow Efficiency and Oxygen Transfer Efficiency", which is fully incorporated herein by reference.

The clarifier may alternatively be circular in plan view and be surrounded by an endless channel which is also circular so that the outer wall of the clarifier is used as at least a portion of the inside wall of the channel. If a longer channel is needed for the barrier oxidation ditch, however, it may be doubled so that there is an inner channel surrounding the clarifier and an outer channel surrounding the inner one, with a cross-over therebetween which flowably connects the channels and also forms the barrier beneath which the mixed liquor is continuously pumped by a downflow impeller located on the upstream side of the barrier and within the outer channel.

The means for intercepting the clarifier feed stream is at least one clarifier feed conduit or pipe that traverses the wall of the draft tube or discharge duct, penetrates into the flow moving through the funnel, draft tube, and discharge duct, and has an intake end which is open to intercept a portion of this flow. The means for conveying the intercepted portion and transmitting the received pump head is an extended conduit that has a length extending to and into the clarifier, a discharge end within the clarifier, and a valve located on the conduit between the traversed wall and the discharge end. Preferably, the clarifier feed conduit contains only gentle curves or long-radius pipe bends and is lined with friction-reducing material, such as polytetrafluoroethylene, or is formed of a low-friction material, such as polyvinylchloride (PVC), polyethylene, glass, or Merline ®, a trademark of X-Tex, Cincinnati, Ohio, for retaining as much static head as possible.

A barrier oxidation ditch typically has a pumped flow that is 50 to 600 times as great as the incoming flow being aerobically treated within its endless channel. A barrier oxidation ditch treating one million gallons per day, for example, is spoken of as a "one mgd" wastewater treatment plant. Its pumped flow is consequently 50 mgd to 600 mgd or 34,700 to 417,000 gpm. The proportionate flow to the clarifier is approximately twice the incoming flow. For the one mgd barrier oxidation ditch, the clarifier feed stream should typically be 1.5 to 2.5 mgd or 1,050 to 1,750 gpm. The return sludge stream, assuming that 100% of the sludge is recycled, is approximately one half of the feed stream to the clarifier. All of the clarified liquor, also equalling one half of the clarifier feed stream, leaves the system.

When an aeration basin and a clarifier of this invention are constructed so that they have integral structure with respect at least to one common wall and so that they include a means for interception of directly pumped currents in the aeration basin to create a differential hydraulic head in the clarifier that enables the sludge return flow to operate without a pump, the clarifier is herein defined as an integral clarifier. When, in combination, they lack integral structure but have a means to intercept a portion of the directly pumped flow and its pump head and to convey both to the clarifier for creating a differential hydraulic head, the clarifier is termed a pumpless clarifier. It should be understood, therefore, that an integral clarifier is also a pumpless clarifier, but the converse is not necessarily true.

DESCRIPTION OF THE PREFERRED EMBODIMENTS

Figure 1:
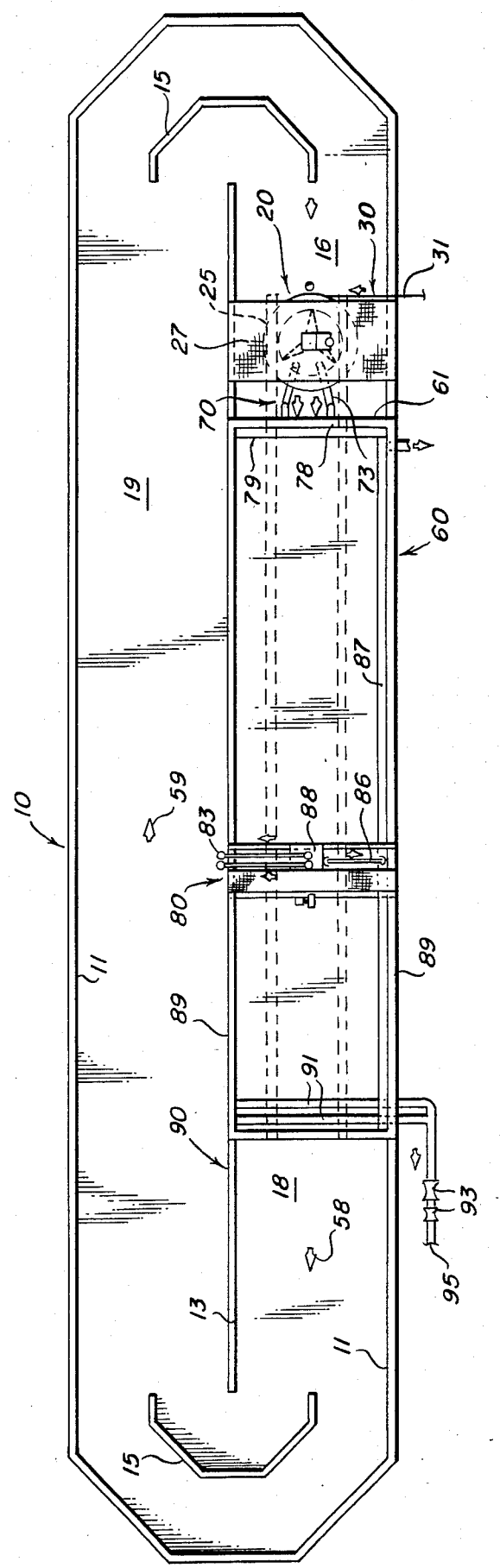
FIG. 1 is a plan view of a barrier oxidation ditch, comprising a rectangularly shaped clarifier which forms its barrier and is disposed in the upper part of its discharge channel. A liquor/air feed mixture is forced into intake pipes' below the impeller and fed to the clarifier under sufficient positive pressure to maintain a differential hydraulic head between the level of liquor in the clarifier and in the return channel.
Figure 2:
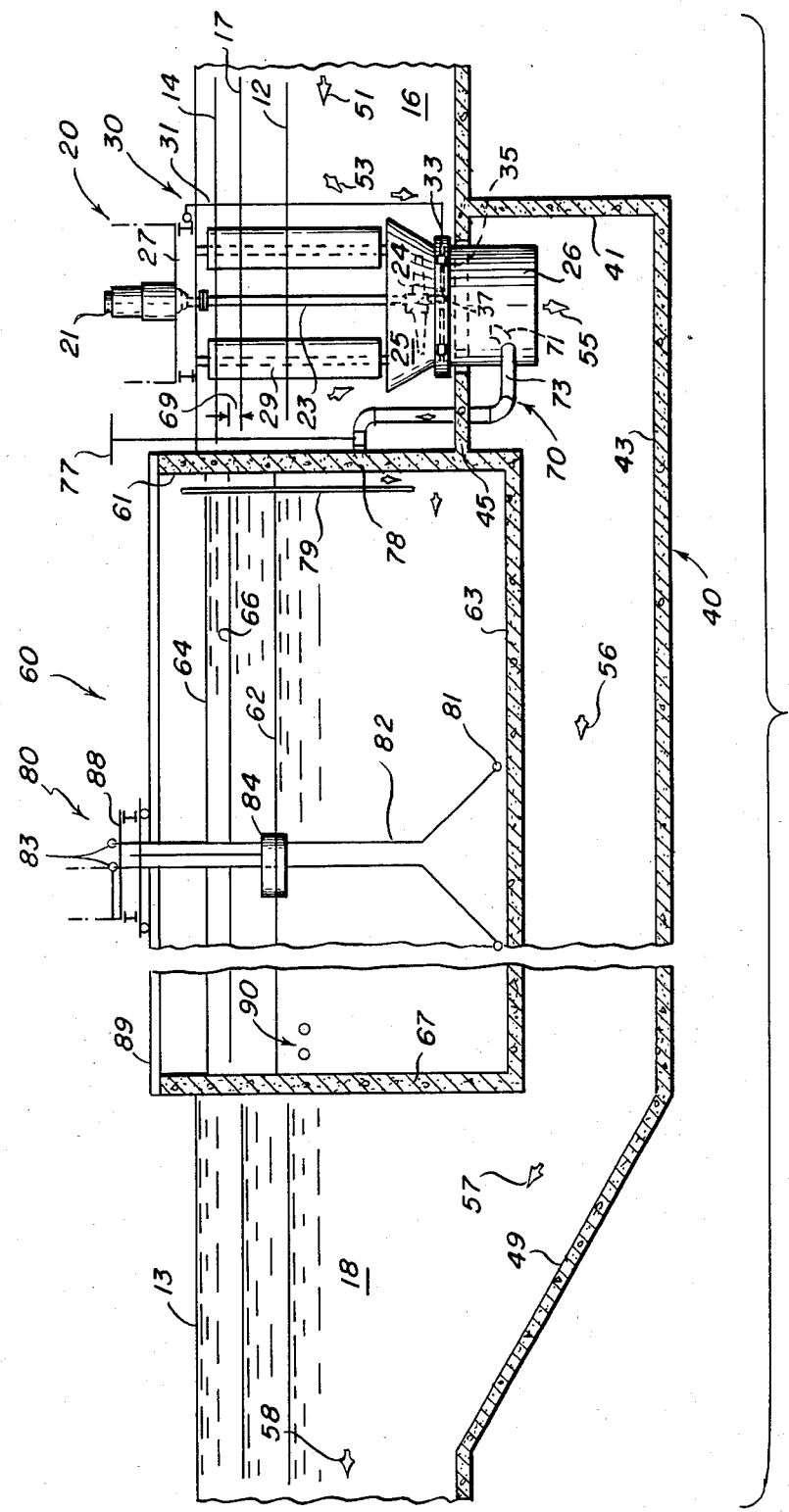
FIG. 2 is a sectional elevational view of the same barrier oxidation ditch, looking in the direction of the arrows 2—2 in FIG. 1, which shows the feeding and discharging devices for the clarifier.
Figure 3:
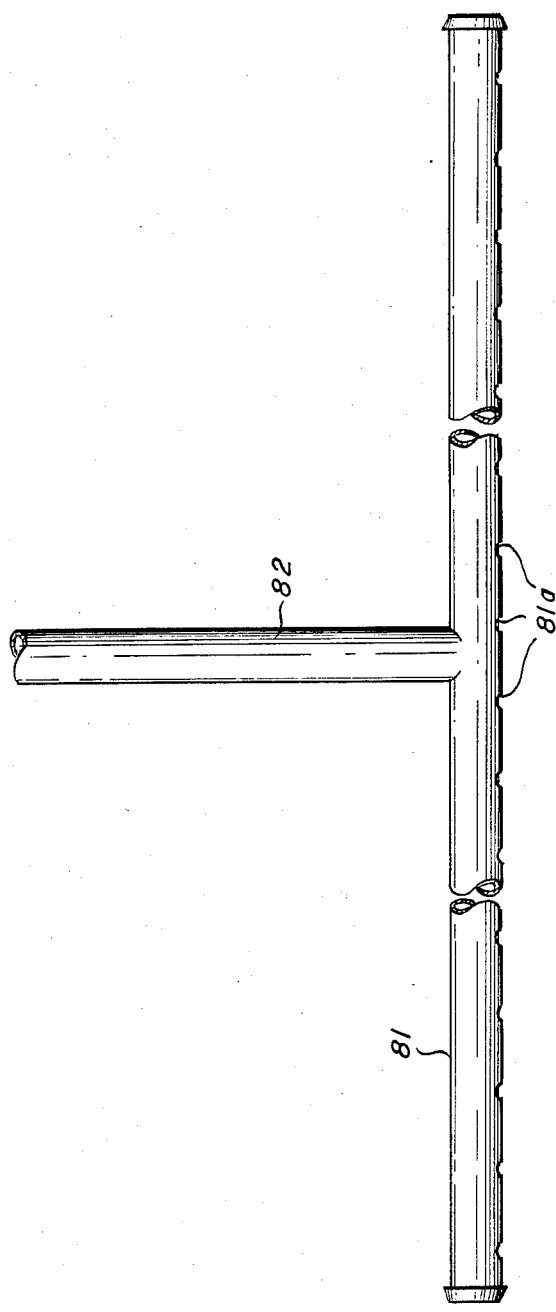
FIG. 3 is a partial elevational view of a siphon header, looking in the direction of the arrows 3—3 in FIG. 2.

The barrier oxidation ditch 10 seen in FIGS. 1–3 comprises an endless channel, a circulator/aerator assembly 20, an air sparge assembly 30, a discharge duct 40, and an in-channel clarifier 60. The endless channel is defined by outer side 11 and central partition 13. One straight portion of this endless channel is return channel 19. In the other straight portion of the endless channel, between central partition 13 and one straight side 11, is pumpless in-channel clarifier 60. Its upstream wall 61 is also the barrier which separates this portion of the endless channel into an intake channel 16 and a discharge channel 18. End baffles 15 face each end of central partition 13 in order to guide the pumped mixed liquor around the ends of the endless channel.

Circulator/aerator 20 is mounted in the bottom of intake channel 16 and comprises a motor and reduction gear 21, a shaft 23 which is rigidly connected at its upper end to the reduction gear, an impeller 24 which is rigidly attached to the lower end of shaft 23, a funnel 25 within which impeller 24 rotates, a downdraft tube 26 which is attached to the lower end of funnel 25, a walkway 27 which surrounds motor and reduction gear 21,
and vortex-controlling vanes 29 which are attached, top and bottom, respectively, to walkway 27 and funnel 25.

Air sparge assembly 30 comprises an air sparge feed line 31, an air header 33, a sparge ring 35, and sparge fingers 37 from which air emerges to become sheared by the downrushing liquor to form air bubbles.

Discharge duct 40 comprises an upstream wall 41, a bottom 43, a horizontal barrier 45 surrounding downdraft tube 26, and a discharge ramp 49. The portion beneath horizontal barrier 45 is a turbulence zone in which intense mixing occurs.

The flow of liquor through the endless channel is illustrated by translational flow 51 in intake channel 16, flow 53 toward the intake of funnel 25, downward flow 55 from downdraft tube 26, translational flow 56 beneath clarifier 60, upward flow 57 over ramp 49, translational flow 58 in discharge channel 18, and translational return flow 59 in return channel 19.

Clarifier 60 comprises upstream wall 61 which also functions as the barrier in the endless channel, bottom 63 which also functions as the ceiling for the portion of discharge duct 40 through which translational flow 56 moves, downstream wall 67, clarifier feed system 70, travelling siphon mechanism 80, and clarified liquor withdrawal system 90. The clarified liquor has a surface 66.

Clarifier feed system 70 comprises upwardly curved intakes 71 for a liquor/air mixture within downdraft tube 26, feed lines 73, valves 75, valve handles 77, discharges 78, and an optional transversely disposed baffle 79. Intakes 71 may be equipped with small funnels to decrease entrance losses as the liquor and air move into line 73, but valve handles 77 (controlled by the operator) are the means of establishing a selected flow rate through valves 75 that will create the desired differential hydraulic head 69 that siphon meachnism 80 needs to provide the required sludge return flow rate, according to experience.

Within the endless channel, low liquor level 12, high liquor level 14, and average liquor level 17 within the channel 18 become slightly lower at about the mid-length of return channel 19 and even lower in intake channel 16. However, the decrease in head, from discharge channel 18 to intake channel 16, is slight enough to be ignored for the purposes of this invention.

Travelling bridge siphon mechanism 80 comprises sludge pick-up headers 81 for the sludge at the bottom of clarifier 60, sludge siphon and return lines 82, sludge discharge siphons 83 into return channel 19, floating skimmer 84, scum outlet 86, scum trough 87 to receive scum from outlet 86, travelling bridge and motor 88, and rails 89 which mechanism 80 travels longitudinally of clarifier 60. Headers 81 have a plurality of suction holds 81a for the inflowing settled sludge.

Clarified liquor system 90 comprises submerged orifice discharge lines 91, an an effluent rate-of-flow device and valve 93. The clarified liquor then generally flows to a disinfection system, a post-aeration system, and to a final discharge point.

Clarifier 60 is a self-regulating and functioning system. Its feed is obtained through liquor intakes 71 which may each be equipped with intake funnels for interupting downflowing mixed liquor and air bubbles and receiving the pump head thereof for increasing the intake pressure and consequently the flow rate. The total available pump head is a function of the elevation from intakes 71 to low liquor level (LWL) 12, high liquor level (HWL) 14, or average liquor level (AWL) 17 plus the pump head generated by the circulator/aerator and the flowing liquor/air mixture. However, the elevation head is small in comparison to the pump head, and the differential hydraulic head between LWL 12 and HWL 14 can be neglected; i.e., for practical purposes, the pump head upon the liquor/air mixture entering intakes 71 is a constant.

Because scum outlet 86 and clarified liquor discharge 95 are gravity discharge devices, whereas sludge return 82 is a siphon device, low clarified liquor level 62, high liquor level 64, and average liquor level 66 within clarifier 70 are always higher by a $\Delta H$ 69 than corresponding low mixed liquor level 12, high liquor level 14, and average liquor level 17 within the intake channel, as seen in FIG. 2. The critical differential hydraulic head for siphon activity affecting sludge discharge siphon 83 is the difference between the liquor level within clarifier 60 and the liquor level within return channel 19 which is always slightly greater than the level 12, 14, 17 within intake channel 16. This critical head is hereinafter identified as the siphon delivery head and is to be understood as represented by $\Delta H$ 69.

When, for example, the liquor level in the endless channel of barrier oxidation ditch 10 is rising, as from LWL 12 to HWL 14, $\Delta H$ 69 becomes smaller because the delivery rate through intakes 71, 73, 78 into clarifier 60 is substantially constant. However, a smaller $\Delta H$ 69 causes the sludge delivery rate to decrease while the scum removal rate and the clarified liquor delivery rate remain substantially constant. The result is that LWL 62 also rises toward HWL 64 while lagging behind the rise in intake channel 16 so that the sludge return rate through sludge return pipes 83 remains less than normal until HWL 64 is reached. At this level, the sludge return rate rises to the normal value, maintaining HWL 64 constant until HWL 14 begins to decrease again. While HWL 14 is decreasing toward LWL 12, HWL 64 is decreasing toward LWL 62 but again lagging behind the fall in intake channel 16 so that the sludge return rate remains greater than normal until the water level again remains stable, such as at AWL 17.

Figure 4:
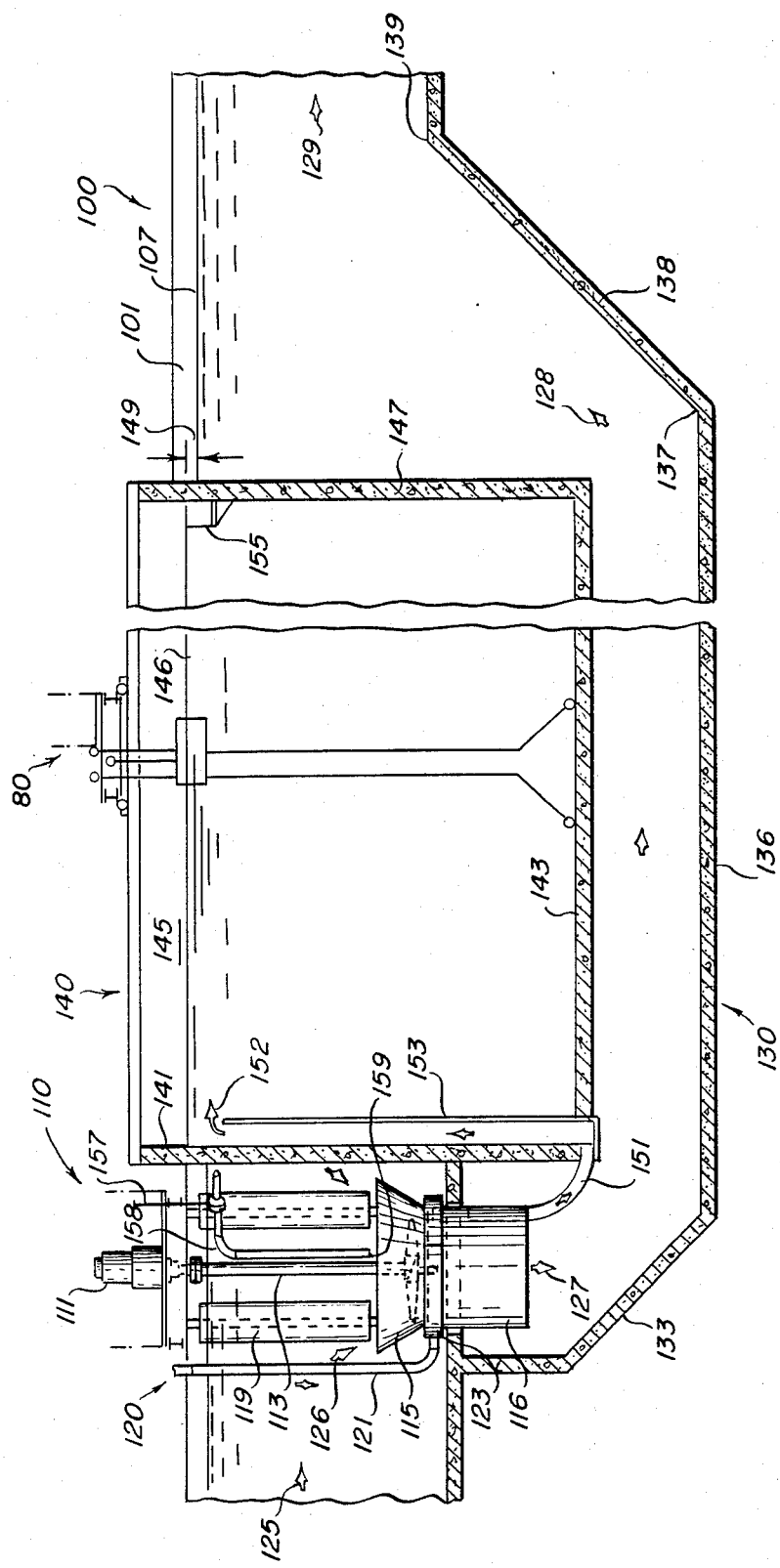
FIG. 4 is a sectional elevational view of a barrier oxidation ditch, having a relatively deep clarifier forming its barrier and occupying the upper portion of its discharge channel. A feed mixture of liquor and air are guided into an intake tube in the initial portion of its discharge duct and fed into the front edge of the clarifier. The sludge return is also fed into the intake funnel, close to the hub of the impeller.
Figure 5:
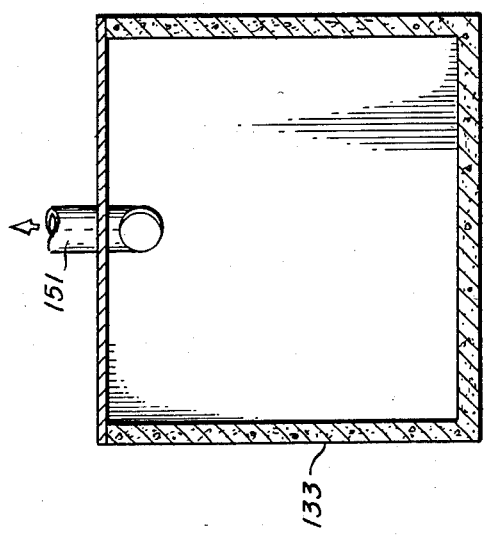
FIG. 5 is a sectional view, looking in the direction of the arrows 5—5 in FIG. 4, through the intake tube.
Figure 6:
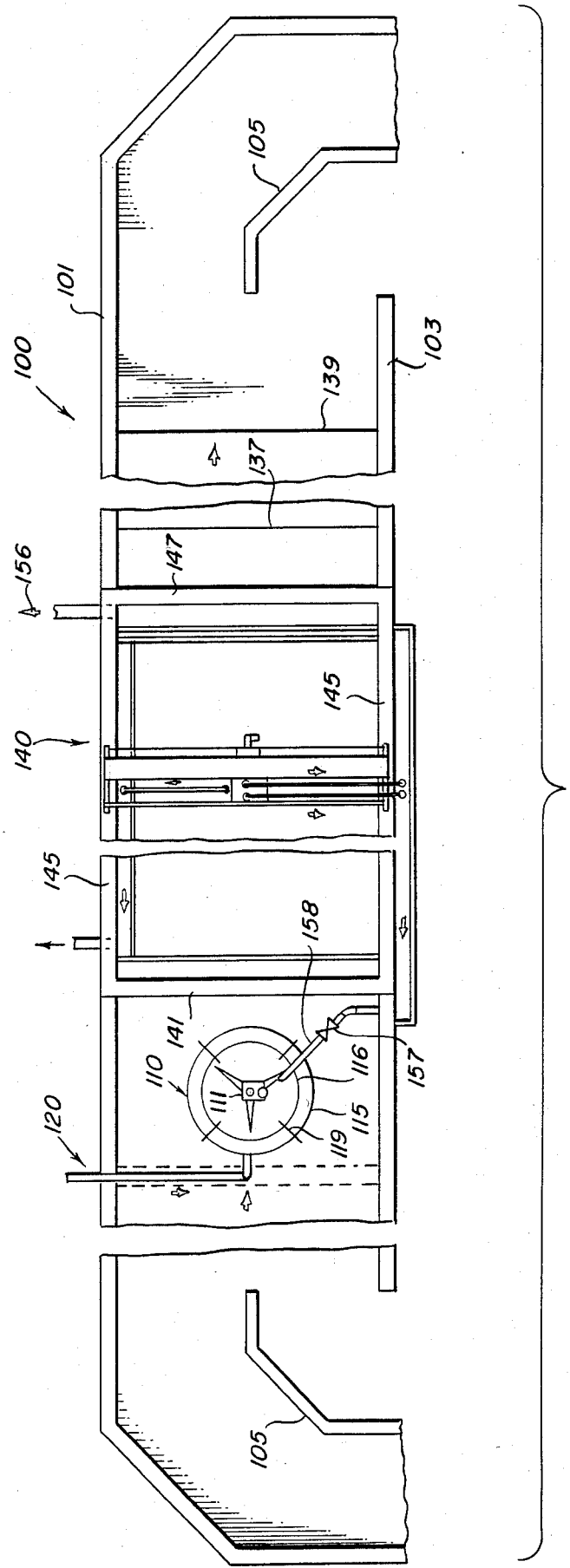
FIG. 6 is a plan view of the intake channel, circulator/aerator, clarifier, and terminal portion of the discharge channel for the barrier oxidation ditch seen in FIG. 4.

The barrier oxidation ditch shown in FIGS. 4-6 uses the pump head of the liquor/air mixture within its draft tube for producing a positive differential hydraulic head within the clarifier and for withdrawing its return sludge by suction as well as by gravity. A siphoning system, such as mechanism 80 in FIGS. 1-3, is not shown but can be used in the clarifier. Ditch 100 comprises sides 101 of its endless channel, a central partition 103, end baffles 105, a circulator/aerator assembly 110, an air sparge assembly 120, a discharge duct 130, and a clarifier 140.

Circulator/aerator assembly 110 comprises a motor/reducer 111, a shaft 113, a funnel 115, a down-flow draft tube 116, and vanes 119. Air sparge assembly 120 comprises an air sparge feed line 121 and an air header 123. Discharge duct 130 comprises a 90° portion 133 which is flow connected to down-draft tube 116, a horizontal portion 136 beneath clarifier 140, and an ascending portion 138 which is connected to horizontal portion 136 along line 137 and intersects the bottom of discharge channel 108 along line 139, as seen in FIG. 6. Portions 136 and 138 are preferably as wide as the channel and clarifier 140.

Clarifier 140 comprises an upstream wall 141 which also functions as the barrer across the channel, a horizontally disposed bottom 143, side walls 145, and a downstream wall 147. The clarified liquor has an average level 146 that creates a $\Delta H$ 149 with average mixed liquor level 107. The liquor intake system comprises a liquor inlet duct 151, attached to the inner surface of curved discharge duct 133, which is connected to the vertical flow space between wall 141, and vertically disposed liquor intake baffle 153 at the upstream end of clarifier 140.

Sludge return line 158, from the siphon system which is shown in the drawings or alternatively from a multi-inlet gravity sludge system, is connected to a sludge trough which runs along one side of clarifier 140, as seen in FIG. 6. Line 158 is controlled by valve handles 157 from the walkway (also not shown in FIGS. 3 and 6) before emptying into approximately the center of funnel 115 where the swirling forces generated by the impeller create suction forces on sludge outlets 159 which assist in movement of the settled sludge from the bottom portion of clarifier 140.

A conventional clarified liquor outlet or effluent launder 155 is at the far end of clarifier 140, alongside downstream wall 147, for discharging the clarified liquor. A scum skimmer is not shown in FIGS. 4-6.

The flow pattern in barrier oxidation ditch 100 is shown by flow vectors 125 and 126 in intake channel 125, flow vector 127 to represent the downwardly pumped liquor/air mixture from downdraft tube 116, flow vector 128 to represent the liquor/air mixture being discharged from discharge duct 130, and flow vector 129 to represent the aerated mixed liquor in discharge channel 108. The liquor/air mixture entering inlet duct 151 flows into clarifier 140 as shown by flow vector 152. The clarified liquor outflow from launder 155 is represented by flow vector 156 in FIG. 6.

The mixed liquor intake for a clarifier operated in combination with a barrier oxidation ditch can be located anywhere that high velocity is available from the action of the impeller. Such high velocity is available from within the intake funnel to the exit end of the discharge duct. However, it is preferred that the mixed liquor be admixed with an oxygen-containing gas, such as air, before it enters the clarifier intake in order to maximize the concentration of dissolved oxygen in the intake liquor to the clarifier. Accordingly, the intake location within the draft tube, as seen in FIG. 4, is often preferable.

Figure 7:
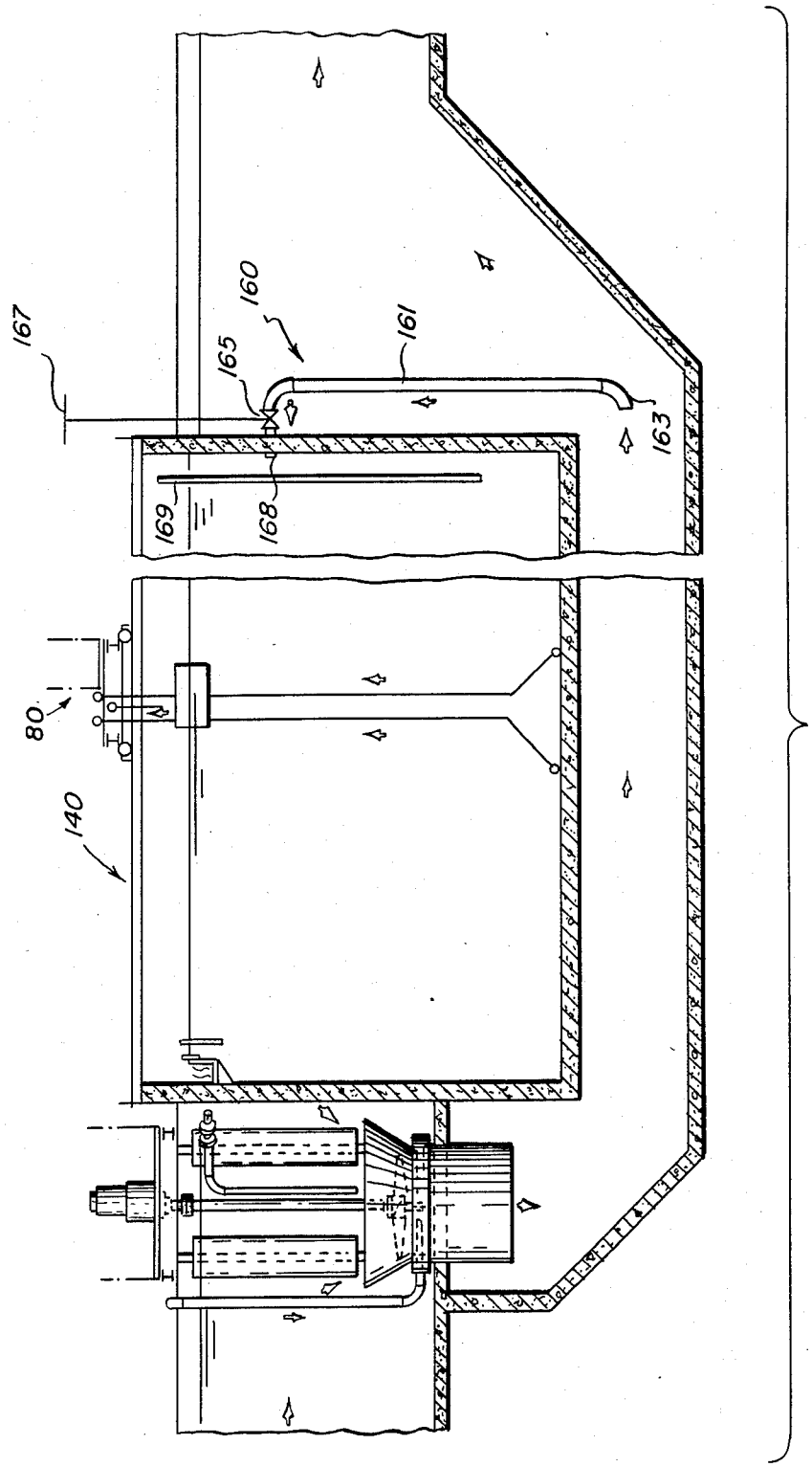
FIG. 7 is a sectional view of a portion of the barrier oxidation ditch and the clarifier of FIGS. 4–6 with a different embodiment of the mixed liquor intake in which an intake tube intercepts well-aerated mixed liquor at the downstream end of the clarifier.

The terminal location for the liquor intake which is shown in FIG. 7 is accordingly highly preferred in many situations because the liquor and the air bubbles have been in contact for almost the entire time that is available within discharge duct 130, yet the aerated liquor is moving at high speed and even accelerating while uprushing over ascending bottom 138. Liquor intake system 160 for clarifier 140' within barrier oxidation ditch 100 comprises at least one intake tube 161 having an intake end 163, a discharge end 164, a control valve 165, and a control handle 167 which is operable from a walkway not shown in the drawings. Inflowing liquor is guided and turbulence is minimized within clarifier 140' by optional baffle plate 169. The liquor outlet line is located along the upstream wall.

Figure 8:
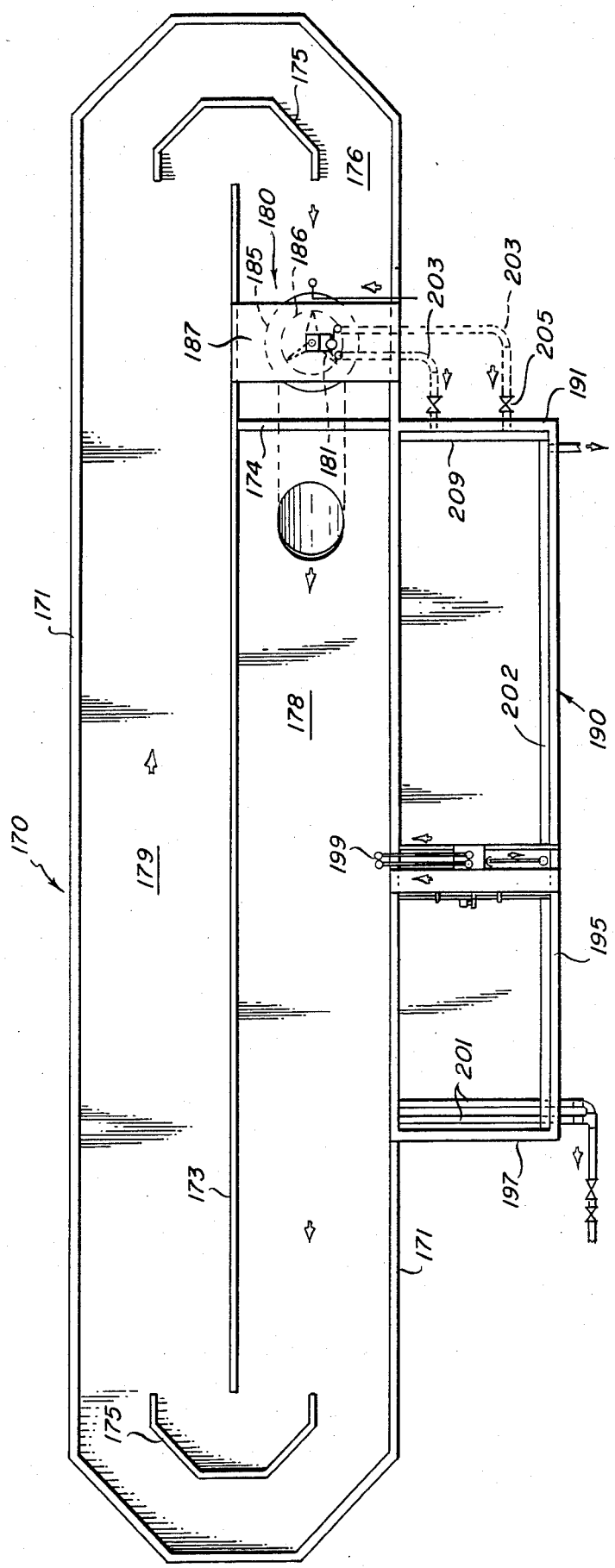
FIG. 8 is a plan view of a barrier oxidation ditch and of a rectangular clarifier which is alongside its discharge channel. The clarifier is fed by intake tubes within the downdraft tube so that it has a positive differential head. Its return sludge is discharged by siphon flow to the discharge channel of the barrier oxidation ditch.

The alongside-channel embodiment illustrated in FIG. 8 has been in operation in several locations except for its liquor intake system. Barrier oxidation ditch 170 comprises sides 171 of its endless channel, a central partition 173, a barrier 174 which is sealably disposed athwart the channel, a pair of end baffles 175, an intake channel 176, a discharge channel 178, a return channel 179, a circulator/aerator assembly 180, and a clarifier 190. Circulator/aerator assembly 180 comprises a motor 181, a funnel 185, a downdraft tube 186, and a walkway 187. An air sparge assembly is shown and is to be understood as being of conventional construction.

Clarifier 190 comprises an upstream wall 191, a side wall 195 (the outer side wall is formed by side 171), a downstream wall 197, a travelling bridge sludge siphon mechanism, clarified liquor lines 201, a scum trough 202, feed lines 203 for the mixed liquor/air intake mixture, and an intake baffle 209. Sludge discharge 199 is into discharge channel 178. Control valves 205 are used to set the flow of liquor/air mixture from downdraft tube 186.

Figure 9:
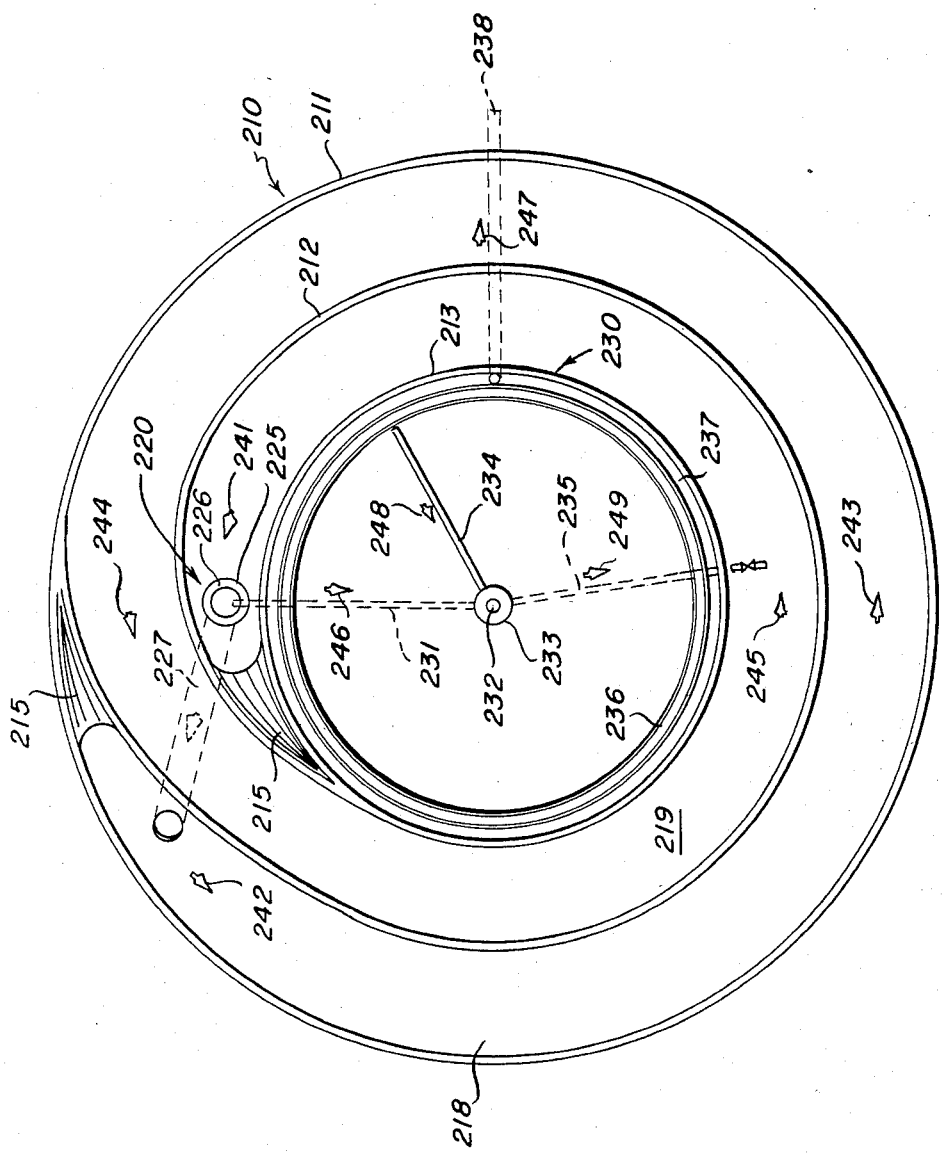
FIG. 9 is a plan view of a circular barrier oxidation ditch and a center-feed circular clarifier, in combination.
Figure 10:
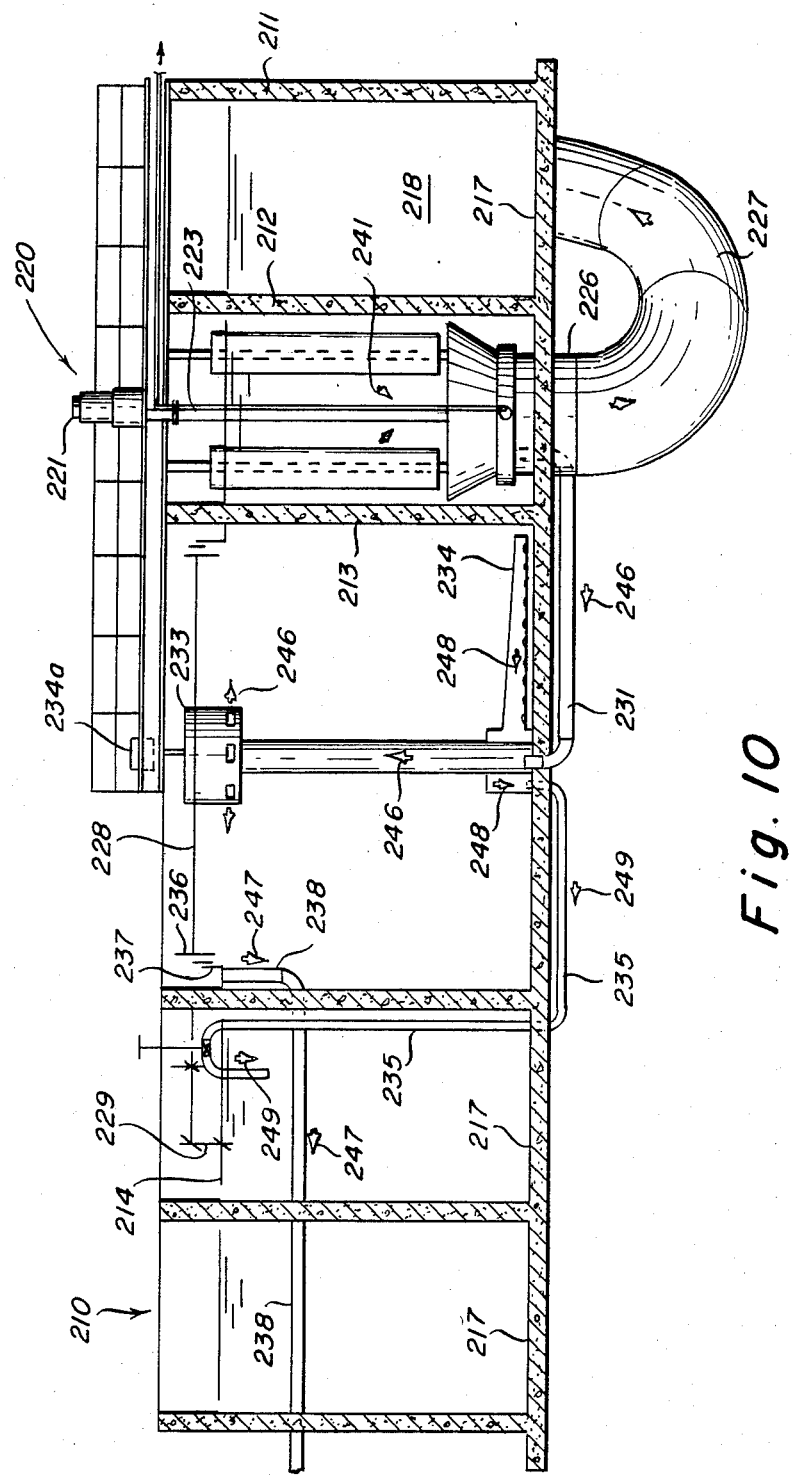
FIG. 10 is a sectional elevational view of the ditch and clarifier of FIG. 9, looking in the direction of the arrows 10—10 in FIG. 9.

The combination of circular barrier oxidation ditch 210 and circular clarifier 230 which is shown in FIGS. 9 and 10 permits both to operate with no other power devices than the motors for the impeller and the sludge siphon arm and the blower for the compressed air, because gravity or siphon devices can propel the clarified liquor and sludge. A conventional scum trough (not shown in FIGS. 9 and 10) can be installed on the surface of clarifier 230 for capturing floating scum or it can be installed along the inner surface of side 213.

Circular barrier oxidation ditch 210, as seen in FIGS. 9 and 10, comprises an outer cylindrical side 211, a middle cylindrical side 212, an inner cylindrical or clarifier side 213, a bottom 217, grouted slopes 215, a circulator/aerator assembly 220, and a clarifier 230. Circulator/aerator assembly 220 comprises a motor 221, a shaft 223, a funnel 225, a downdraft tube 226, to a discharge duct 227 which is flow connected to tube 226, an air supply line 222, and an air header 224.

Clarifier 230 comprises a clarifier feed or intake line 231 for the liquor/air mixture, a feed riser 232, a clarifier center feed well 233, a sludge siphon arm 234, a sludge return line 235, a cylindrical scum baffle 236, an effluent weir trough 237, a clarified liquor discharge line 238, and a bottom 239. Clarified liquor surface 228 is higher by differential hydraulic head ($\Delta H$) 229 than mixed liquor surface 214 in return channel 219. Return channel 219 includes at least the second half of the outer channel and at least the first half of the inner channel. The sludge discharges from siphon line 235 into return channel 219 where the liquor is in an anoxic state and ready for denitrification.

Vector 241 denotes flow into circulator/aerator 220, and vector 242 denotes flow from discharge duct 227 and through discharge channel 218. Vector 243 shows flow through the outer channel, and vector 244 indicates flow from the outer channel to the inner channel. Vector 245 indicates flow through the inner channel.

Vector 246 shows the discharge of the mixture of mixed liquor and air through line 231 and from clarifier feed well 233 into clarifier 230. Vector 247 indicates the flow of clarified liquor through line 236. Vector 248 shows the intake of settled sludge from the sludge blanket into sludge siphon arm 234 and then into siphon line 235, and vector 249 indicates its flow through line 235 and discharge into return channel 219.

Figure 11:
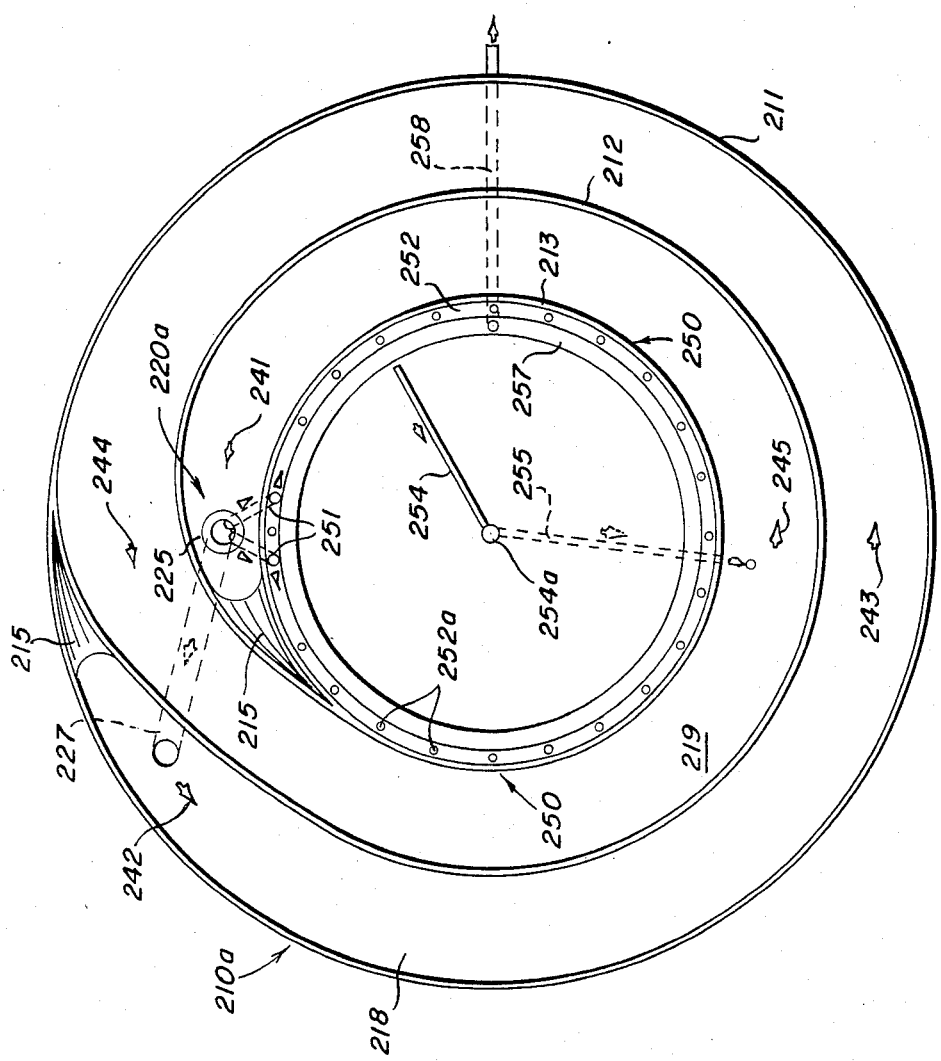
FIG. 11 is a plan view of a circular barrier oxidation ditch and a peripheral-feed circular clarifier, in combination.
Figure 12:
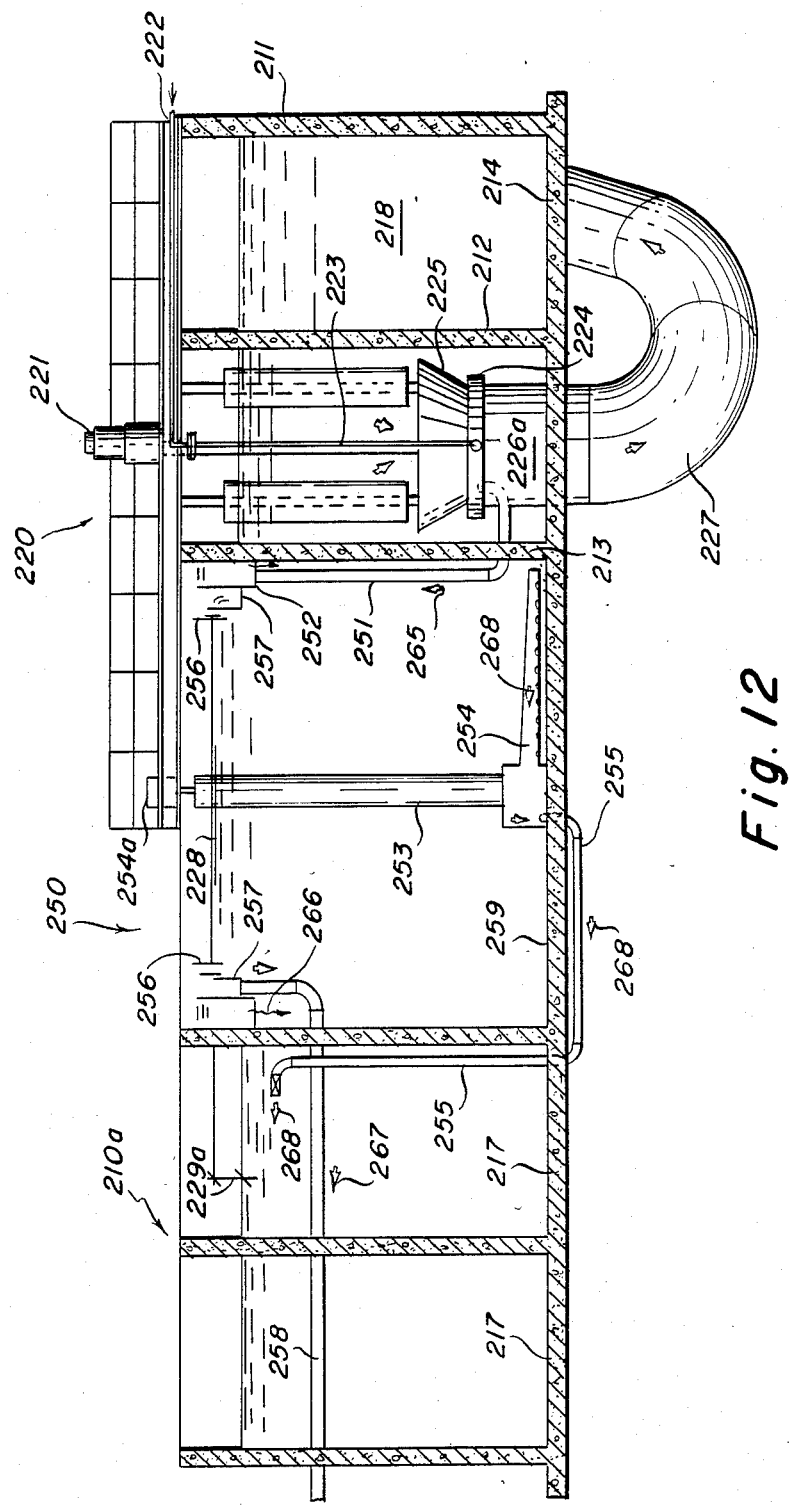
FIG. 12 is a sectional elevational view of the clarifier shown in FIG. 11, looking in the direction of the arrows 11—11 in FIG. 11.

The circular barrier oxidation ditch shown in FIGS. 11 and 12 is built around a circular clarifier having a sludge return system which is operated by gravity flow instead of by siphon flow, as in FIGS. 9 and 10. Barrier oxidation ditch 210a in FIGS. 11 and 12 is exactly like ditch 210 in FIGS. 9 and 10, and its parts, vectors, and the like bear the same numbers. The only significant difference is that circulator/aerator assembly 220a comprises a longer draft tube 226a than draft tube 220 as seen in FIG. 10 so that its funnel 225a is higher than funnel 225 in FIG. 10.

Moreover, clarifier 250 of FIGS. 11 and 12 is very similar to clarifier 230 of FIGS. 9 and 10 except that it has a peripheral feed system, in contrast to the central feed system of clarifier 230, and a gravity return system for its settled sludge. Both clarifiers 230, 250 also have a peripheral effluent trough for collecting the clarified liquor.

Clarifier 250 comprises a pair of very short clarifier intake or feed lines 251, a peripheral influent trough 252, a center post 253, a revolvable sludge siphon arm 254, a motor 254a for driving arm 254 which is mounted atop post 253, a sludge return line 255, a scum baffle 256, a peripheral effluent trough 257, an effluent discharge line 258, and a bottom 259.

Pipes 251 lead from draft tube 226a to and through wall 213 and into the bottom of influent trough 252 which has closely spaced outlet holes or parts 252a in its bottom throughout its circular length, as seen in FIG. 11. Vector 265 accordingly indicates the flow of a mixed liquor/air mixture through lines 251 into trough 252, and flow arrow 266 indicates downward flow from the plurality of ports 252a. Vector 267 indicates the flow of clarified liquor through line 258. Vector 268 indicates the flow of settled sludge through siphon arm 254 and then through and out of line 255.

The clarified liquor has a surface 228 which is higher by differential head 229a than surface 214 of the translationally flowing mixed liquor in return channel 219. This differential head can be designated as $H_C$, the head needed for gravity or siphon operation of clarifier 250.

Figure 13:
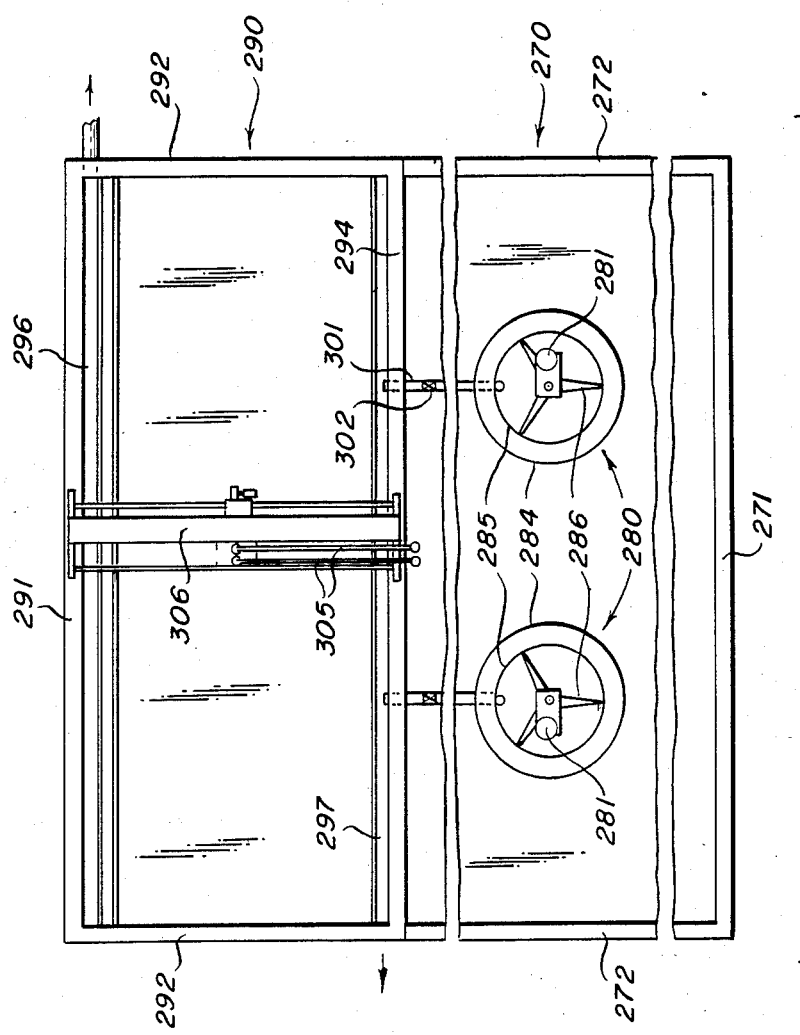
FIG. 13 is a plan view of a complete mix tank and of an adjoining integral clarifier.
Figure 14:
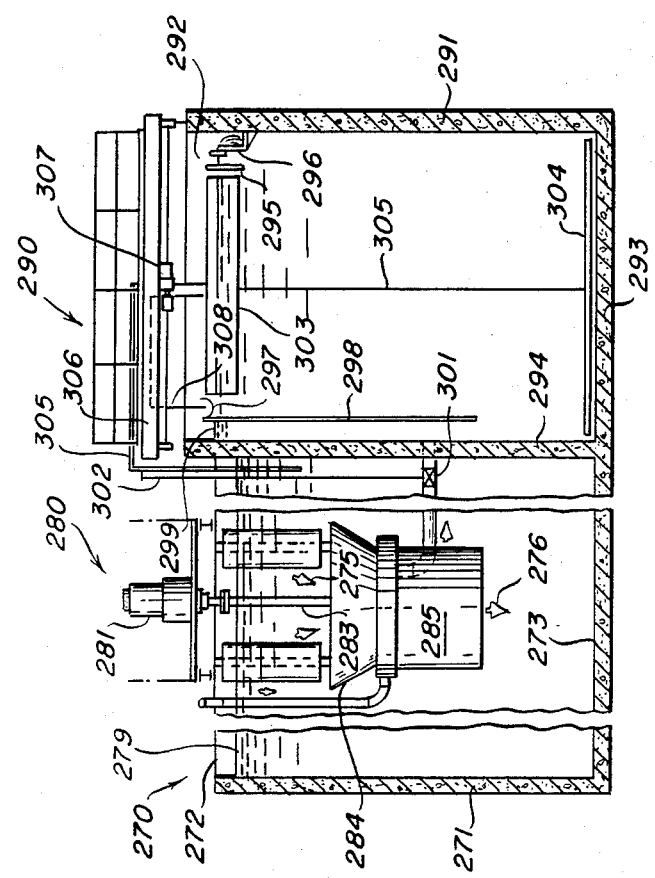
FIG. 14 is a sectional elevational view of the complete mix tank and clarifier of FIG. 13.

FIGS. 13 and 14 show a complete mix tank 270 and a clarifier 290 in adjoining relationship. Clarifier 290 is operable without a pump by using a portion of the pump heads available from two of its circulator/aerator assemblies 290 for creating a differential hydraulic head between the surface of its clarified liquor and the surface of the agitated mixed liquor in tank 270.

Complete mix tank 270 in FIGS. 13 and 14 comprises an outer wall 271, end walls 272, a bottom 273, and a plurality of draft tube circulator/aerator assemblies 280. Each circulator/aerator assembly 280 comprises a motor/gear reducer 281, a shaft 283, a funnel 284, a draft tube 285 which is flow connected to funnel 284, and an impeller 286 which rotates within draft tube 285 and is attached to the lower end of shaft 283.

Vector 275 shows the flow of liquor into funnel 284, and vector 276 indicates the downward discharge of liquor and air from draft tube 285. The mixed liquor has a generally turbulent surface 276.

Clarifier 290, adjoining complete mix tank 270 in FIGS. 13 and 14, comprises an outer wall 291, end walls 292, a bottom 293, a common wall 294 with tank 270, a scum baffle 295 near wall 291, an effluent overflow through 296 adjacent wall 291, a scum trough 297 near wall 294, and an influent baffle 298 which is near wall 294 and supports trough 297. The clarified liquor has a surface 299 which is higher than surface 279 by differential head ($\Delta H$) which is visible but not labelled in FIG. 14.

Mixed liquor and its associated pump head are fed through intake lines 301 and valves with handles 302 to and through wall 294 to discharge into the stilling space provided by influent baffle 298. Floating skimmer 303 collects scum which is passed through scum pipe 308 to scum trough 297. Siphon sludge pickup header 304, which is moved back and forth by motor 307 on traveling bridge pickup mechanism 306, removes sludge from bottom 293. The sludge is then siphoned through line 305 into tank 270.

The following design example refers to the combination of the clarifier and the barrier oxidation ditch shown In FIGS. 1 and 2:

DESIGN EXAMPLE

A. Assumptions

1. Average Daily Flow=1.0 Million Gallons per Day (MGD); Minimum 3 Hour Flow=0.33 MGD; Peak 3 Hour Flow=2.0 MGD.
2. Influent BOD=206 mg/l=1720 pounds of biochemical oxygen demand per day (#BOD/day).
3. 1.8# Oxygen Supplied/#BOD Applied.

B. Oxidation Ditch Design

1. AOR=1.8 (1720)/24=129#$O_2$/HR.
   SOR/AOR 1.33 for specific process conditions of altitude, U-tube depth, and temperature.
   $SOR_{20°}$ c. 172.5#$O_2$/HR.

Sparge 350 cfm of air into Circulator/Aerator (DTA), having a 72-inch diameter draft tube and a 30-HP motor, which pumps the mixed liquor into a U-tube or discharge duct which has a center-line depth equal to 5 feet deep below the average water level in the oxidation ditch and is approximately 135 feet long and is estimated to produce 50% oxygen transfer efficiency at depth.

DTA pumping rate=166.25 cubic feet per second (cfs) and time in draft tube=12.2 seconds.

2. Use Oxidation Ditch with $$\frac{\text{Average X-Section Area}}{166.25/155 \ 1.0726 \text{ feet per second (fps)}} = 155 \text{ ft.}^2$$

for design velocity.

3. Ditch Volume=750,000 gallons for average hydraulic detention time=18 hours; F/Mv ratio=

$$\frac{206 \ (1.0)}{0.75 \ (3500 \text{ mg/l})} = .08 \text{#BOD/per pound of mixed liquor volatile suspended solids (#MLVSS)}$$

(assuming MLVSS concentration = 3500 mg/l)

4. Channel Width=15.5 feet.
   Minimum liquid depth=10.0 feet.
   Average depth=11.50 feet.
   Maximum liquid depth=13.0 feet.
   Effective length=645 feet.

C. Clarifier Design

Surface Overflow Area = 15.5 feet (width) × 130 feet (length)
= 2015 feet$^2$

Hydraulic Surface Loading Rate =

$$\frac{1,000,000 \text{ gallons per day (gpd)}}{2015 \text{ ft.}^2} = 496 \text{ gpd/f5.}^2$$

Under average conditions:
Depth=13.0 feet
Volume=26,200 feet$^3$
Detention time=4.70 hours
Horizontal velocity=0.46 ft/min.

D. A 30 HP DTA operating in a 72-inch diameter draft tube, drawing 30 (0.90)=27 bhp, will pump 166.25 cfs at a total head of about 1.07 feet.

E. The head loss occuring at 166.25 cfs from the draft tube inlet past the draft tube air sparge is approximately 0.40 feet, leaving a remaining available pump head at the clarifier feed pipe inlet of 1.07−0.40=0.67 feet.

F. Clarifier is to use a conventional traveling bridge siphon mechanism with two 8-inch diameter PVC siphon pipes, each with 8-inch PVC bottom pickup pipe with twelve 3-inch diameter sludge intake orifices.

G. Siphon Piping Headloss Vs. Flow

Two sludge return siphons, each designed for 50% of average daily flow rate,=0.50 (1.0)=0.50 MGD average flow; total sludge return rate=100% average designed flow (ADF).

| Plant Inflow | Siphon Flow per Siphon Pipe | Total Siphon Sludge Flow** | Total Calc. Headloss* |
|---|---|---|---|
| 0.50 MGD | 0.25 MGD | 0.50 MGD | 0.1252 ft. |
| 1.00 | 0.50 | 1.0 | 0.4530 |
| 1.20 | 0.60 | 1.2 | 0.5547 |
| 1.50 | 0.75 | 1.5 | 0.963 |
| 2.00 | 1.0 | 2.0 | 1.672 |
| 2.50 | 1.25 | 2.5 | 2.57 |
| 3.00 | 1.50 | 3.0 | 3.61 |

*For 8-inch PVC Siphon Piping as shown
**Designed to equal 100% of plant inflow

H. Clarifier Influent Flow Vs. Headloss Vs. Siphon Head Produced

| Plant Inflow | Clarifier Influent Flow/Pipe | Total Clarifier Influent Flow | Total Calc. Headloss* | Available Siphon Head* |
|---|---|---|---|---|
| 0.50 MGD | 0.50 MGD | 1.0 MGD | 0.0373 ft. | +0.6327 ft. |
| 1.0 | 1.0 | 2.0 | 0.1255 | +0.5445 |
| 1.20 | 1.20 | 2.4 | 0.189 | +0.481 |
| 1.50 | 1.50 | 3.0 | 0.2750 | +0.3950 |
| 2.0 | 2.0 | 4.0 | 0.4854 | +0.1846 |
| 2.5 | 2.5 | 5.0 | 0.744 | −0.074 |
| 3.0 | 3.0 | 6.0 | 1.054 | −0.384 |

Figure 15:
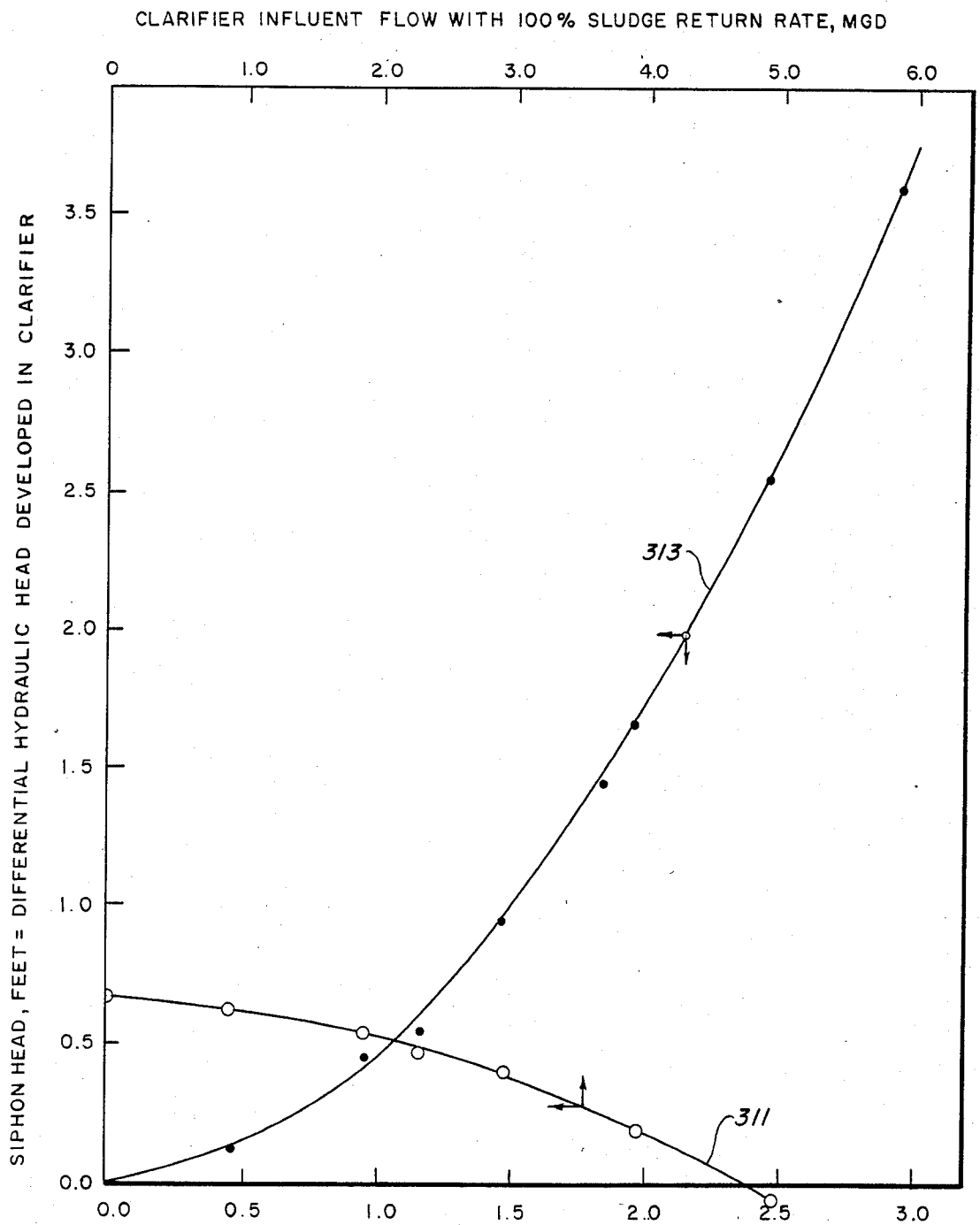
FIG. 15 is a graph showing the effect of siphon head upon clarifier intake flow rate and upon sludge return flow rate.

*Available Siphon Head = 0.67 − Total Calculated Headloss = head available between higher clarifier water level and lower oxidation ditch liquor level to generate sludge siphon flow. In FIG. 15, a descending curve 311 represents the Siphon Head as a function of the Clarifier Influent Flow, and an ascending curve 313 represents the Siphon Head as a function of the Siphon Flow which equals the Plant Inflow when all of the settled sludge is intended to be returned to the aeration basin.

Figure 16:
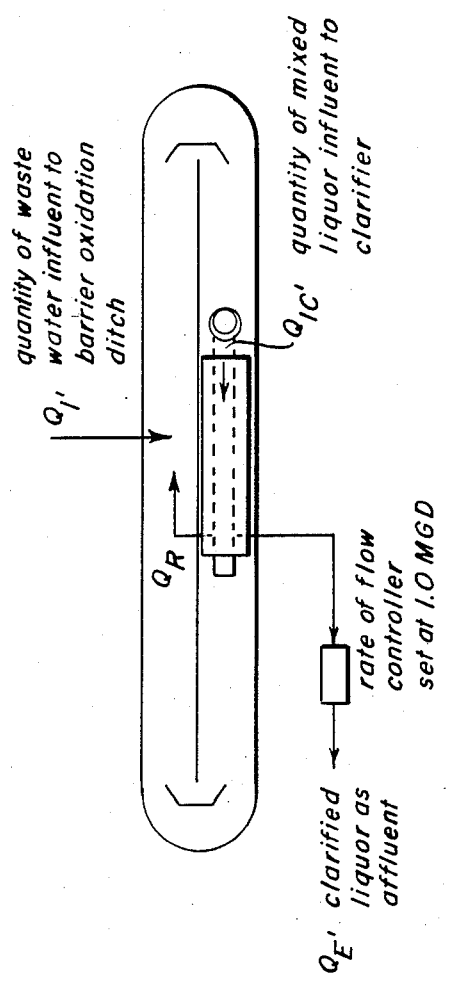
FIG. 16 is a small schematic plan view of a barrier oxidation ditch and of an integral clarifier within its discharge channel in which the various flows, Q, into and out of the ditch and clarifier are identified.

Based on these curves in FIG. 15 and referring to the schematic plan view of a barrier oxidation ditch and an in-channel integral clarifier in FIG. 16, the following conclusions can be made:

1. Clarifier Inflow Rate=$Q_{IC}$=1.1(2)=2.2 MGD when the Clarifier Water Level is +0.50 feet above the Oxidation Ditch Water Level (HC=+0.50 feet) influent to Clarifier; when the Clarifier water level is +0.50 feet above the ditch water level, the total siphon sludge return flow=$Q_R$=1.1 MGD which is approximately equal to the average daily oxidation ditch influent flow rate of 1.0 MGD.

2. If the oxidation ditch inflow rate increases to the 3-hour peak flow rate=2.0 MGD; assuming $Q_{IC}$ remains steady at about 2.2 MGD and $Q_R$ remains at 1.1 MHD, the oxidation ditch water level will rise as follows:

$$Q_I + Q_R = 2.0 + 1.1 = 3.1 \; MGD$$

$$\text{while } Q_{IC} = \underline{2.2 \; MGD}$$

$$\text{accumulation rate} = +0.90 \; MGD$$

$$\frac{0.90}{24} (3) = 112{,}500 \text{ gallons accumulated}$$

$$\text{in 3 hours} = 37{,}500 \text{ gph accumulated}$$

$$= 5012.7 \; ft^3/hour$$

at this accumulation rate, the level of the mixed liquor in the barrier oxidation ditch will rise at a rate of:

$$5012.7/(645)(15.5) = \Delta d$$

$$0.50 \; ft/hr = \Delta d$$

Therefore, in 15 minutes the $\Delta d$ would be $0.50/4 = 0.125$ ft.; as the ditch liquor level rises, the siphon head $= H_C$ will be reduced to:

$$0.50 - 0.125 = 0.3750 \; ft.$$

as $H_C$ is reduced, the siphon sludge return flow will be reduced from 1.1 MGD to about 0.90 MGD, and, $Q_{IC}$ will increase to 3.1 MGD, as shown in FIG. 11; then if $Q_E$ remains steady at 1.0 MGD, the clarifier will accumulate water at the rate of:

$$3.1 - 0.90 - 1.0 = +1.2 \; MGD$$

$$= +50{,}000 \text{ gallons per hour}$$

$$= +6683.5 \; ft^3/hr$$

then the clarifier water level will try to rise at a rate of:

$$6683.5/130 \; (15.5) = +3.31 \; ft/hr$$

which is a faster rise rate than the oxidation ditch, indicating that the clarifier water level and ditch liquor level will rise together with a differential head $= H_C = 0.50$ ft $\pm$ being maintained.

3. If the ditch inflow rate decreases to the minimum 3-hour flow $= 0.33$ MGD, then the ditch water level will try to fail at the following rate:

$$Q_{IC} = 2.2 \; MGD \text{ (assume steady)}$$

$$Q_I = 0.33 \; MGD$$

$$Q_E = 1.0 \; MGD \text{ (assume steady)}$$

$$Q_R = 1.1 \; MGD \text{ (assume steady)}$$

$$Q_I + Q_R = 0.33 + 1.1 = 1.43 \; MGD$$

$$\text{while } Q_{IC} = \underline{2.2 \; MGD}$$

$$\text{loss rate} = -0.77 \; MGD$$

$$+ 4289 \; ft^3/hr$$

At this loss rate, the oxidation ditch water level will *drop* at a rate of:

$$-4289/(645)(15.5) = -0.43 \; ft/hr = \Delta d$$

Therefore, in 15 minutes the d would be 0.1072 ft.; as the ditch level falls, the siphon head, $H_C$, will try to increase to:

$$0.50 + 0.1072 = 0.6072 \; ft.$$

as $H_C$ is increased, the siphon sludge return flow will be increased from 1.1 MGD to about 1.22 MGD, and, $Q_{IC}$ will increase the same; $Q_{IC}$ will decrease to 1.0 MGD; then if $Q_E$ remains steady, the clarifier will lose water at the rate of:

$$1.0 - 1.22 - 1.0 = -1.22 \; MGD$$

$$= -50833 \; gal/hr$$

$$= -6795 \; ft^3/hr$$

then the clarifier water level will try to *drop* at a rate of:

$$-6795/(130)(15.5) = -3.37 \; ft/hr$$

which is a faster drop rate than the oxidation ditch, indicating that the clarifier water level and ditch liquor level will also drop together with a differential head $= H_C = 0.50$ ft. $\pm$ being maintained.

Because it will be readily apparent to those skilled in the wastewater treatment art that innumerable variations, modifications, applications, and extensions of the examples and principles hereinbefore set forth can be made without departing from the spirit and the scope of the invention, what is herein defined as such scope and is desired to be protected should be measured, and the invention should be limited, only by the following claims.

What is claimed is:

1. A clarifier which is continuously operable without a pump in combination with a barrier oxidation ditch having an endless channel, a circulator/aerator assembly which is disposed within said channel, an air sparge assembly, a downdraft tube within which said assemblies are mounted, a discharge duct which is flow connected to said downdraft tube, and a barrier which is sealably disposed athwart said channel, comprising:

A. a clarifier feed system which comprises:
(1) a means for intercepting a clarifier feed stream of mixed liquor as a portion of the flow being pumped past said barrier and for selectively receiving the pump head of at least said feed stream; and
(2) a means for conveying said feed stream, while substantially conserving said pump head, from said barrier oxidation ditch to said clarifier, whereby the surface of clarified liquor in said clarifier is continuously maintained at a higher level than the surface of liquor in said endless channel of said barrier oxidation ditch to create a differential hydraulic head therebetween;

B. an outlet means for discharging clarified liquor from said clarifier;

C. a sludge recycle means for returning settled sludge from said clarifier to said endless channel; and D. a means for sealably isolating the contents of said clarifier from said mixed liquor in said endless channel.

2. The clarifier of claim 1, wherein said flow is pumped downwardly by a downflow impeller, as a part of said circulator/aerator assembly, which forces said flow through said downdraft tube.

3. The clarifier of claim 2, wherein said feed stream intercepting and receiving means is an upwardly curved mixed liquor intake line which traverses the wall of said downdraft tube, whereby said intercepting is performed within said downdraft tube.

4. The clarifier of claim 3, wherein said clarifier is rectangular in shape, having a pair of short sides and a pair of long sides.

5. The clarifier of claim 4, wherein said clarifier is disposed within said endless channel and downstream of said barrier.

6. The clarifier of claim 5, wherein said barrier is formed by one of said short sides of said clarifier.

7. The clarifier of claim 6, wherein said discharge duct extends beneath said clarifier and beyond the other of said short sides, whereby said flow is pumped beneath said barrier and said clarifier until said flow emerges within said endless channel and past said other short side.

8. The clarifier of claim 7, wherein said clarifier comprises sludge discharge siphons which discharge sludge into said endless channel without utilizing a pump therefor.

9. The clarifier of claim 3, wherein said clarifier is rectangular in shape and is disposed alongside said endless channel.

10. The clarifier of claim 9, wherein said rectangular clarifier is surrounded by said endless channel.

11. The clarifier of claim 3, wherein said clarifier is circular in shape and is disposed alongside said endless channel.

12. The clarifier of claim 11, wherein said circular clarifier comprises a center-feed well into which said intake line discharges.

13. The clarifier of claim 11, wherein said circular clarifier comprises a peripheral influent trough, and wherein said clarifier intake line extends from said downdraft tube to said trough.

14. The clarifier of claim 13, wherein said clarifier comprises a revolving sludge pick-up arm.

15. The clarifier of claim 11, wherein said circular endless channel comprises an inner channel, an outer channel, and a cross-over therebetween which forms said barrier.

16. The clarifier of claim 2, wherein said discharge duct passes beneath said barrier.

17. The clarifier of claim 16, wherein said feed stream intercepting and receiving means is a mixed liquor intake tube having an intake end which is disposed within said discharge duct, whereby said intercepting is performed within said discharge duct.

18. A process for continuously clarifying a portion of mixed liquor being aerobically treated in a barrier oxidation ditch by gravity settling said portion in a clarifier to produce clarified liquor and settled sludge without utilizing a pump for mixed liquor feed to said clarifier, clarified liquor outflow from said clarifier, or sludge return from said clarifier to said ditch, said barrier oxidation ditch comprising an endless channel containing said mixed liquor which is moving in circuit flow therethrough, a barrier sealably disposed athwart said endless channel to form an intake channel and a discharge channel, and a circulator/aerator for aerating and pumping said mixed liquor from said intake channel to said discharge channel at high velocity, said process comprising:

A. locating at least one intake line for mixed liquor feed to said clarifier where said high velocity is available;

B. disposing said intake line so that said high-velocity liquor is intercepted and the pump head of said high-velocity liquor is selectively received; and C. transferring said mixed liquor feed to said clarifier while conserving said pump head so that the surface of clarified liquor within said clarifier is higher than the surface of said mixed liquor within said endless channel, the contents of said clarifier being sealably isolated from the contents of said endless channel.

19. The process of claim 18, wherein said aerating and pumping causes a mixture of mixed liquor and air to move downwardly at said high velocity.

20. The process of claim 19, wherein said locating of said intake line is below said aerating and said mixture is intercepted, whereby said mixed liquor feed is aerated when said mixture is transferred to said clarifier.

21. The process of claim 20, wherein said settled sludge is transferred to said endless channel by siphoning.

22. The process of claim 20, wherein said settled sludge is transferred to said endless channel by gravity flow.

23. The process of claim 20, wherein said settled sludge is discharged to said circulator/aerator and is transferred to said endless channel at least partially by suction from passing of said high-velocity liquor.

24. A pumpless clarifier which:

A. is sealably isolated from an activated sludge aeration basin, containing mixed liquor and having a circulator/aerator assembly which is operably mounted therewithin and which pumps a flow of mixed liquor downwardly at high velocity within a draft tube, B. receives a portion of said mixed liquor from said draft tube and separates said portion into clarified liquor and settled sludge; and C. obtains energy for returning said settled sludge to said aeration basin, without use of a pump therefor, from:

(1) a means for intercepting and receiving said portion in the form of said downwardly pumped mixed liquor and the associated pump head thereof within said draft tube; and (2) a means for conveying said feed stream and at least most of said pump head to said clarifier so that a differential hydraulic head is created within said clarifier, between the surface of clarified liquor within said clarifier and the surface of said mixed liquor within said aeration basin.

25. The pumpless clarifier of claim 24, wherein said aeration basin is a complete mix tank.

26. The pumpless clarifier of claim 25, wherein said aeration basin is an oxidation ditch, comprising an endless channel within which said circulator/aerator is operably mounted to provide translational flow of said mixed liquor through said channel.

* * * * *